(12) United States Patent
Pan

(10) Patent No.: US 11,432,354 B2
(45) Date of Patent: Aug. 30, 2022

(54) METHOD AND APPARATUS FOR SUPPORTING UE-TO-NETWORK RELAY COMMUNICATION IN A WIRELESS COMMUNICATION SYSTEM

(71) Applicant: ASUSTek Computer Inc., Taipei (TW)

(72) Inventor: Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/469,423

(22) Filed: Sep. 8, 2021

(65) Prior Publication Data

US 2022/0095398 A1 Mar. 24, 2022

Related U.S. Application Data

(60) Provisional application No. 63/080,999, filed on Sep. 21, 2020.

(51) Int. Cl.
*H04W 76/14* (2018.01)
*H04W 28/02* (2009.01)
(Continued)

(52) U.S. Cl.
CPC ....... *H04W 76/14* (2018.02); *H04W 28/0268* (2013.01); *H04W 88/04* (2013.01); *H04W 92/18* (2013.01)

(58) Field of Classification Search
CPC .... H04B 7/15; H04W 16/26; H04W 28/0268; H04W 28/24; H04W 76/14; H04W 84/047; H04W 84/18; H04W 88/04; H04W 92/18
See application file for complete search history.

(56) References Cited

U.S. PATENT DOCUMENTS

2020/0100088 A1\* 3/2020 Kim ............. H04W 48/16
2021/0144727 A1 5/2021 Pan et al.
(Continued)

FOREIGN PATENT DOCUMENTS

CN 111901840 A \* 11/2020 ........ H04W 36/0085
EP 3678450 7/2020
(Continued)

OTHER PUBLICATIONS

European Search Report in corresponding EP Application No. 21195458.1, dated Feb. 14, 2022.
(Continued)

*Primary Examiner* — Thomas R Cairns
(74) *Attorney, Agent, or Firm* — Skaar Ulbrich Macari, P.A.

(57) ABSTRACT

A method and device are disclosed from the perspective of a first UE. The first UE initiates a first procedure of establishing the one-to-one connection with the second UE for a unicast communication between the first UE and the second UE or for a UE-to-UE communication between the first UE and a third UE via the second UE or a second procedure of establishing the one-to-one connection with the second UE for a UE-to-Network communication between the first UE and a network node via the second UE. The first UE transmits a first PC5-S message to the second UE for completing establishment of a first security context in the first procedure of establishing the one-to-one connection with the second UE for the unicast communication or the UE-to-UE communication if the first procedure is initiated, wherein the first PC5-S message includes QoS information for the unicast communication or the UE-to-UE communication.

18 Claims, 31 Drawing Sheets

(51) Int. Cl.
*H04W 88/04* (2009.01)
*H04W 92/18* (2009.01)

(56) References Cited

U.S. PATENT DOCUMENTS

| | | | |
|---|---|---|---|
| 2021/0185521 A1* | 6/2021 | Purkayastha | H04W 76/25 |
| 2021/0212151 A1* | 7/2021 | Paladugu | H04W 76/28 |
| 2021/0344460 A1* | 11/2021 | Park | H04L 1/1829 |

FOREIGN PATENT DOCUMENTS

| | | | | |
|---|---|---|---|---|
| EP | 3709760 | | 9/2020 | |
| WO | WO-2020168065 A1 | * | 8/2020 | H04W 28/0289 |
| WO | WO-2020168080 A1 | * | 8/2020 | H04W 4/40 |
| WO | WO-2021147771 A | * | 7/2021 | |

OTHER PUBLICATIONS

3rd Generation Partnership Project; Technical Specification Group Core Network and Terminals; Vehicle-to-Everything (V2X) services in 5G System (5GS); Stage 3 (Release 16); 3GPP TS 24.587 V16.1.1 (Jul. 2020); Mobile Competence Centre; 650, Route Des Lucioles; F-06921 Sophia-Antipolis Cedex; France; Jul. 17, 2020, XP051909226.

Huawei (Rapporteur), "Summary of Email Discussion [104#58][NR V2X]—QoS Support for NR V2X", Discussion and Decision; Agenda Item; 11.4.5; R2-1900370; 3GPP TSG-RAN WG2 Meeting #105, Athens, Greece, Feb. 25-Mar. 1, 2019.

Vivo, Huawei, HiSilicon, Ericcson, OPPO, C1, "Handling of PC5 unicast QoS flow match and establishment", Work item code: eV2XARC; C1-204158, 3GPP TSG-CT Meeting #124-e, Electronic meeting, Jun. 2-10, 2020.

* cited by examiner

| IEI | Information Element | Type/Reference | Presence | Format | Length |
|---|---|---|---|---|---|
|  | DIRECT LINK ESTABLISHMENT ACCEPT message identity | PC5 signalling message type 8.4.1. | M | V | 1 |
|  | Sequence number | Sequence number 8.4.2 | M | V | 2 |
|  | Source user info | Application layer ID 8.4.4 | M | LV | 3-253 |
|  | QoS flow descriptions | PC5 QoS flow descriptions 8.4.5 | M | LV-E | 6-65538 |
|  | Configuration of UE PC5 unicast user plane security protection | Configuration of UE PC5 unicast user plane security protection 8.4.23 | M | V | 1 |
| 57 | IP address configuration | IP address configuration 8.4.6 | O | TV | 2 |
| 58 | Link local IPv6 address | Link local IPv6 address 8.4.7 | O | TV | 17 |

FIG. 14 (PRIOR ART)

| IEI | Information Element | Type/Reference | Presence | Format | Length |
|---|---|---|---|---|---|
|  | DIRECT LINK SECURITY MODE COMPLETE message identity | PC5 signalling message type 8.4.1. | M | V | 1 |
|  | Sequence number | Sequence number 8.4.2 | M | V | 1 |
|  | QoS flow descriptions | PC5 QoS flow descriptions 8.4.5 | M | LV-E | 6-n |
|  | UE PC5 unicast user plane security policy | UE PC5 unicast user plane security policy 8.4.22 | M | V | 1 |
| 57 | IP address configuration | IP address configuration 8.4.6 | O | TV | 2 |
| 58 | Link local IPv6 address | Link local IPv6 address 8.4.7 | O | TV | 17 |
| AA | LSBs of $K_{NRP}$ ID | LSBs of $K_{NRP}$ ID 8.4.21 | O | TV | 3 |

METHOD AND APPARATUS FOR SUPPORTING UE-TO-NETWORK RELAY COMMUNICATION IN A WIRELESS COMMUNICATION SYSTEM

CROSS-REFERENCE TO RELATED APPLICATIONS

The present application claims the benefit of U.S. Provisional Patent Application Ser. No. 63/080,999 filed on Sep. 21, 2020, the entire disclosure of which is incorporated herein in their entirety by reference.

FIELD

This disclosure generally relates to wireless communication networks, and more particularly, to a method and apparatus for supporting UE-to-Network relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first User Equipment (UE) to establish one-to-one connection between the first UE and a second UE. In one embodiment, the method includes the first UE initiating a first procedure of establishing the one-to-one connection with the second UE for a unicast communication between the first UE and the second UE or for a UE-to-UE communication between the first UE and a third UE via the second UE or a second procedure of establishing the one-to-one connection with the second UE for a UE-to-Network communication between the first UE and a network node via the second UE. The method also includes the first UE transmitting a first PC5-S message to the second UE for completing establishment of a first security context in the first procedure of establishing the one-to-one connection with the second UE for the unicast communication or the UE-to-UE communication if the first procedure is initiated, wherein the first PC5-S message includes Quality of Service (QoS) information for the unicast communication or the UE-to-UE communication. The method further includes the first UE transmitting a second PC5-S message to the second UE for completing establishment of a second security context in the second procedure of establishing the one-to-one connection with the second UE for the UE-to-Network communication if the second procedure is initiated, wherein the second PC5-S message does not include any QoS information for the UE-to-Network communication.

BRIEF DESCRIPTION OF THE DRAWINGS

FIG. 14 is a reproduction of Table 7.3.2.1.1 of 3GPP TS 24.587 V16.1.0.

FIG. 15 is a reproduction of Table 7.3.14.1.1 of 3GPP TS 24.587 V16.1.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.287 V16.2.0, "Architecture enhancements for 5G System (5GS) to support Vehicle-to-Everything (V2X) services (Release 16)"; TS 24.587 V16.1.0, "Vehicle-to-Everything (V2X) services in 5G System (5GS); Stage 3 (Release 16)"; and TR 23.752 V0.5.0, "Study on system enhancement for Proximity based services (ProSe) in the 5G System (5GS) (Release 17)". The standards and documents listed above are hereby expressly incorporated by reference in their entirety.

Figure 1:
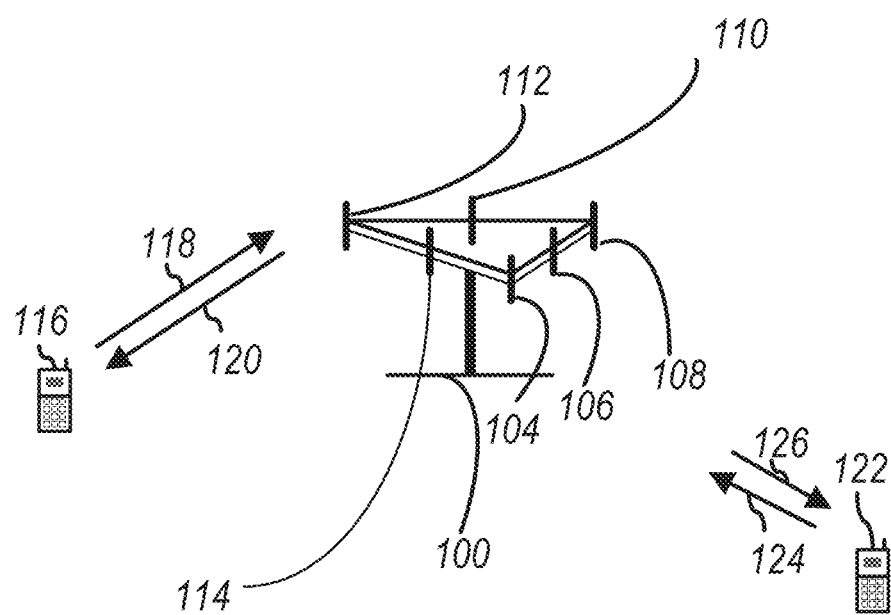
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
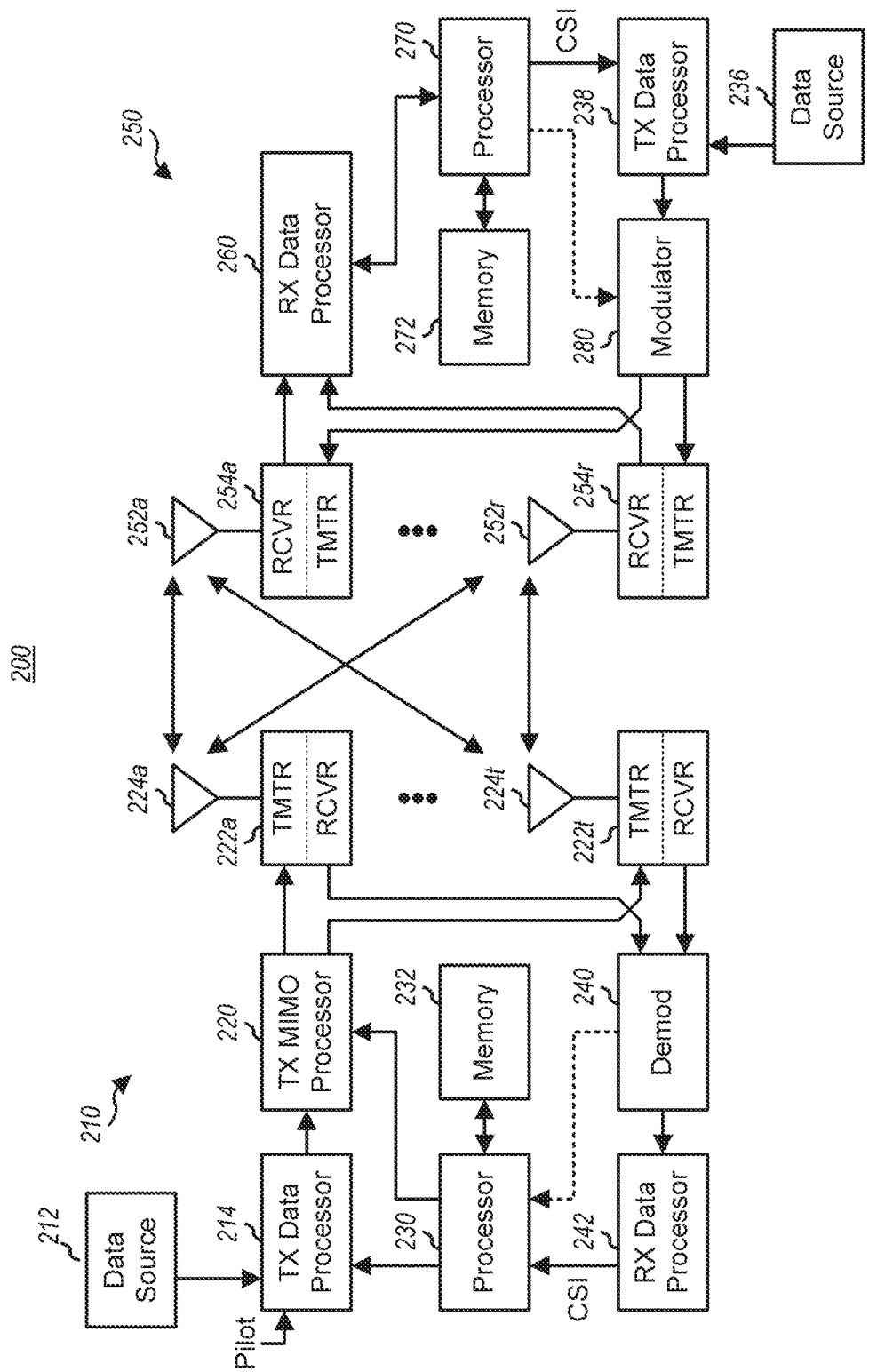
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
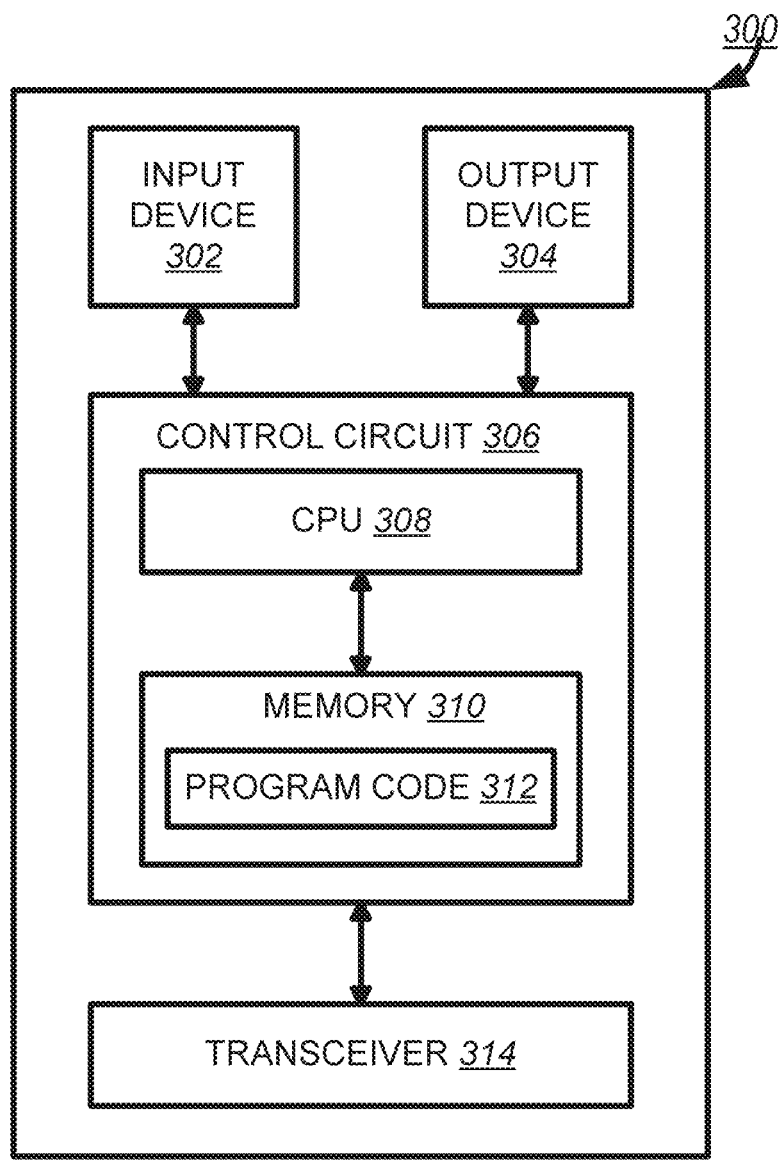
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
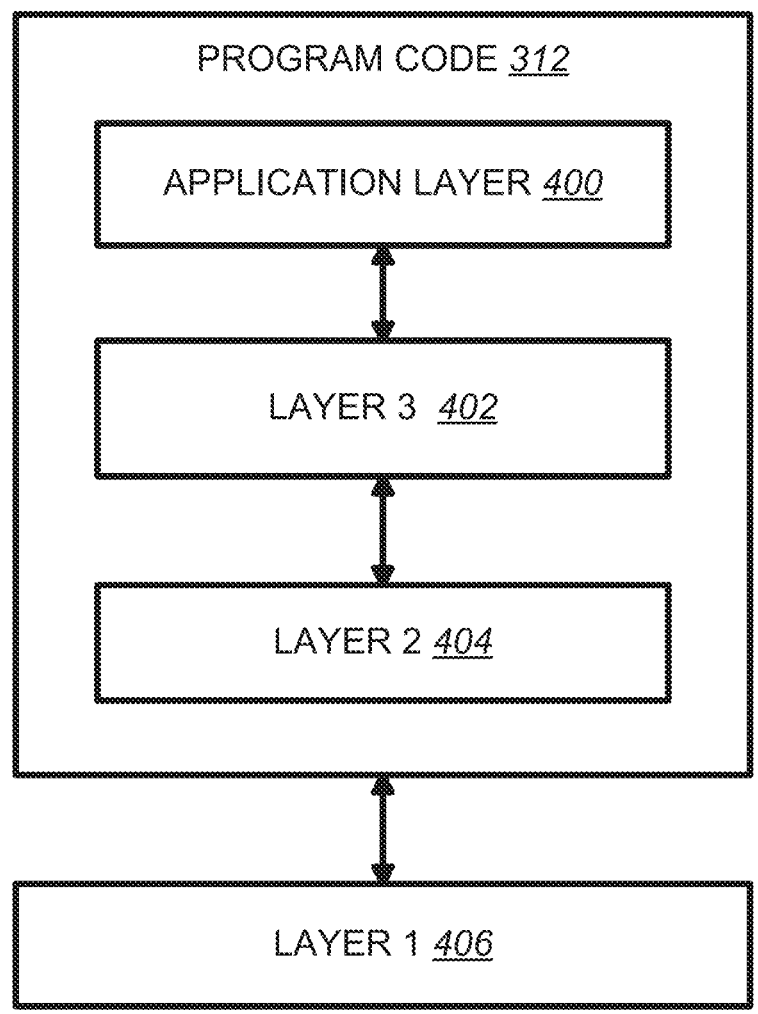
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.287 introduced the following:

5.2.1.4 Unicast Mode Communication Over PC5 Reference Point

Figure 5:
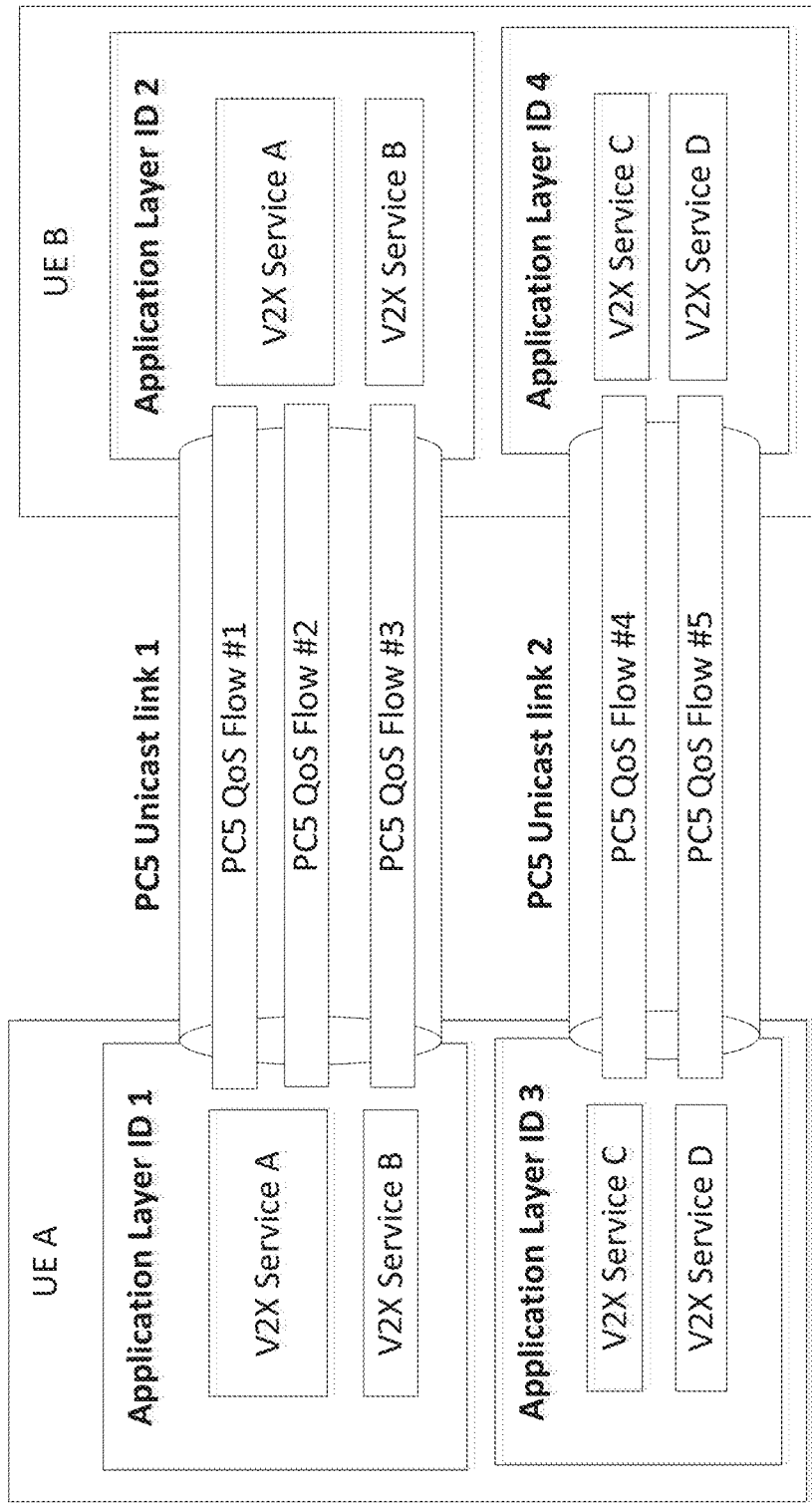
FIG. 5 is a reproduction of FIG. 5.2.1.4-1 of 3GPP 23.287 V16.2.0.

Unicast mode of communication is only supported over NR based PC5 reference point. FIG. 5.2.1.4-1 illustrates an example of PC5 unicast links.

FIG. 5.2.1.4-1 of 3GPP TS 23.287 V16.2.0, Entitled "Example of PC5 Unicast Links", is Reproduced as FIG. 5

The following principles apply when the V2X communication is carried over PC5 unicast link:
  A PC5 unicast link between two UEs allows V2X communication between one or more pairs of peer V2X services in these UEs. All V2X services in the UE using the same PC5 unicast link use the same Application Layer ID.
  NOTE 1: An Application Layer ID can change in time as described in clauses 5.6.1.1 and 6.3.3.2, due to privacy.
  This does not cause a re-establishment of a PC5 unicast link. The UE triggers a Link Identifier Update procedure as specified in clause 6.3.3.2.
  One PC5 unicast link supports one or more V2X service types (e.g. PSIDs or ITS-AIDS) if these V2X service types are at least associated with the pair of peer Application Layer IDs for this PC5 unicast link. For example, as illustrated in FIG. 5.2.1.4-1, UE A and UE B have two PC5 unicast links, one between peer Application Layer ID 1/UE A and Application Layer ID 2/UE B and one between peer Application Layer ID 3/UE A and Application Layer ID 4/UE B.
  NOTE 2: A source UE is not required to know whether different target Application Layer IDs over different PC5 unicast links belong to the same target UE.
  A PC5 unicast link supports V2X communication using a single network layer protocol e.g. IP or non-IP.
  A PC5 unicast link supports per-flow QoS model as specified in clause 5.4.1.

When the Application layer in the UE initiates data transfer for a V2X service type which requires unicast mode of communication over PC5 reference point:
  the UE shall reuse an existing PC5 unicast link if the pair of peer Application Layer IDs and the network layer protocol of this PC5 unicast link are identical to those required by the application layer in the UE for this V2X service, and modify the existing PC5 unicast link to add this V2X service type as specified in clause 6.3.3.4; otherwise
  the UE shall trigger the establishment of a new PC5 unicast link as specified in clause 6.3.3.1.

After successful PC5 unicast link establishment, UE A and UE B use the same pair of Layer-2 IDs for subsequent PC5-S signalling message exchange and V2X service data transmission as specified in clause 5.6.1.4. The V2X layer of the transmitting UE indicates to the AS layer whether a transmission is for a PC5-S signalling message (i.e. Direct Communication Request/Accept, Link Identifier Update Request/Response/Ack, Disconnect Request/Response, Link Modification Request/Accept) or V2X service data.

For every PC5 unicast link, a UE self-assigns a distinct PC5 Link Identifier that uniquely identifies the PC5 unicast link in the UE for the lifetime of the PC5 unicast link. Each PC5 unicast link is associated with a Unicast Link Profile which includes:
  V2X service type(s) (e.g. PSID(s) or ITS-AID(s)); and
  Application Layer ID and Layer-2 ID of UE A; and
  Application Layer ID and Layer-2 ID of UE B; and
  network layer protocol used on the PC5 unicast link; and
  for each V2X service type, a set of PC5 QoS Flow Identifier(s) (PFI(s)). Each PFI is associated with QoS parameters (i.e. PQI).

For privacy reason, the Application Layer IDs and Layer-2 IDs may change as described in clauses 5.6.1.1 and 6.3.3.2 during the lifetime of the PC5 unicast link and, if so, shall be updated in the Unicast Link Profile accordingly. The UE uses PC5 Link Identifier to indicate the PC5 unicast link to V2X Application layer, therefore V2X Application layer identifies the corresponding PC5 unicast link even if there are more than one unicast link associated with one V2X service type (e.g. the UE establishes multiple unicast links with multiple UEs for a same V2X service type).

The Unicast Link Profile shall be updated accordingly after a Layer-2 link modification for an established PC5 unicast link as specified in clause 6.3.3.4 or Layer-2 link identifier update as specified in clause 6.3.3.2.

V2X Service Info and QoS Info are carried in PC5-S signalling messages and exchanged between two UEs as specified in clause 6.3.3. Based on the exchanged information, PFI is used to identify V2X service. When the receiving UE receives V2X service data over the established PC5 unicast link, the receiving UE determines the appropriate V2X service based on the PFI to forward the received V2X service data to the upper layer.

Upon receiving an indication from the AS layer that the PC5-RRC connection was released due to RLF, the V2X layer in the UE locally releases the PC5 unicast link associated with this PC5-RRC connection. The AS layer uses PC5 Link Identifier to indicate the PC5 unicast link whose PC5-RRC connection was released.

When the PC5 unicast link has been released as specified in clause 6.3.3.3, the V2X layer of each UE for the PC5 unicast link informs the AS layer that the PC5 unicast link has been released. The V2X layer uses PC5 Link Identifier to indicate the released unicast link.

[ . . . ]

5.6.1.4 Identifiers for Unicast Mode V2X Communication Over PC5 Reference Point

For unicast mode of V2X communication over PC5 reference point, the destination Layer-2 ID used depends on the communication peer. The Layer-2 ID of the communication peer, identified by the Application Layer ID, may be discovered during the establishment of the PC5 unicast link, or known to the UE via prior V2X communications, e.g. existing or prior unicast link to the same Application Layer ID, or obtained from application layer service announcements. The initial signalling for the establishment of the PC5 unicast link may use the known Layer-2 ID of the communication peer, or a default destination Layer-2 ID associated with the V2X service type (e.g. PSID/ITS-AID) configured for PC5 unicast link establishment, as specified in clause 5.1.2.1. During the PC5 unicast link establishment procedure, Layer-2 IDs are exchanged, and should be used for future communication between the two UEs, as specified in clause 6.3.3.1.

The Application Layer ID is associated with one or more V2X applications within the UE. If UE has more than one Application Layer IDs, each Application Layer ID of the same UE may be seen as different UE's Application Layer ID from the peer UE's perspective.

The UE maintains a mapping between the Application Layer IDs and the source Layer-2 IDs used for the PC5 unicast links, as the V2X application layer does not use the Layer-2 IDs. This allows the change of source Layer-2 ID without interrupting the V2X applications.

When Application Layer IDs change, the source Layer-2 ID(s) of the PC5 unicast link(s) shall be changed if the link(s) was used for V2X communication with the changed Application Layer IDs.

Based on privacy configuration as specified in clause 5.1.2.1, the update of the new identifiers of a source UE to the peer UE for the established unicast link may cause the peer UE to change its Layer-2 ID and optionally IP address/prefix if IP communication is used as defined in clause 6.3.3.2.

A UE may establish multiple PC5 unicast links with a peer UE and use the same or different source Layer-2 IDs for these PC5 unicast links.

[ . . . ]

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

Figure 6:
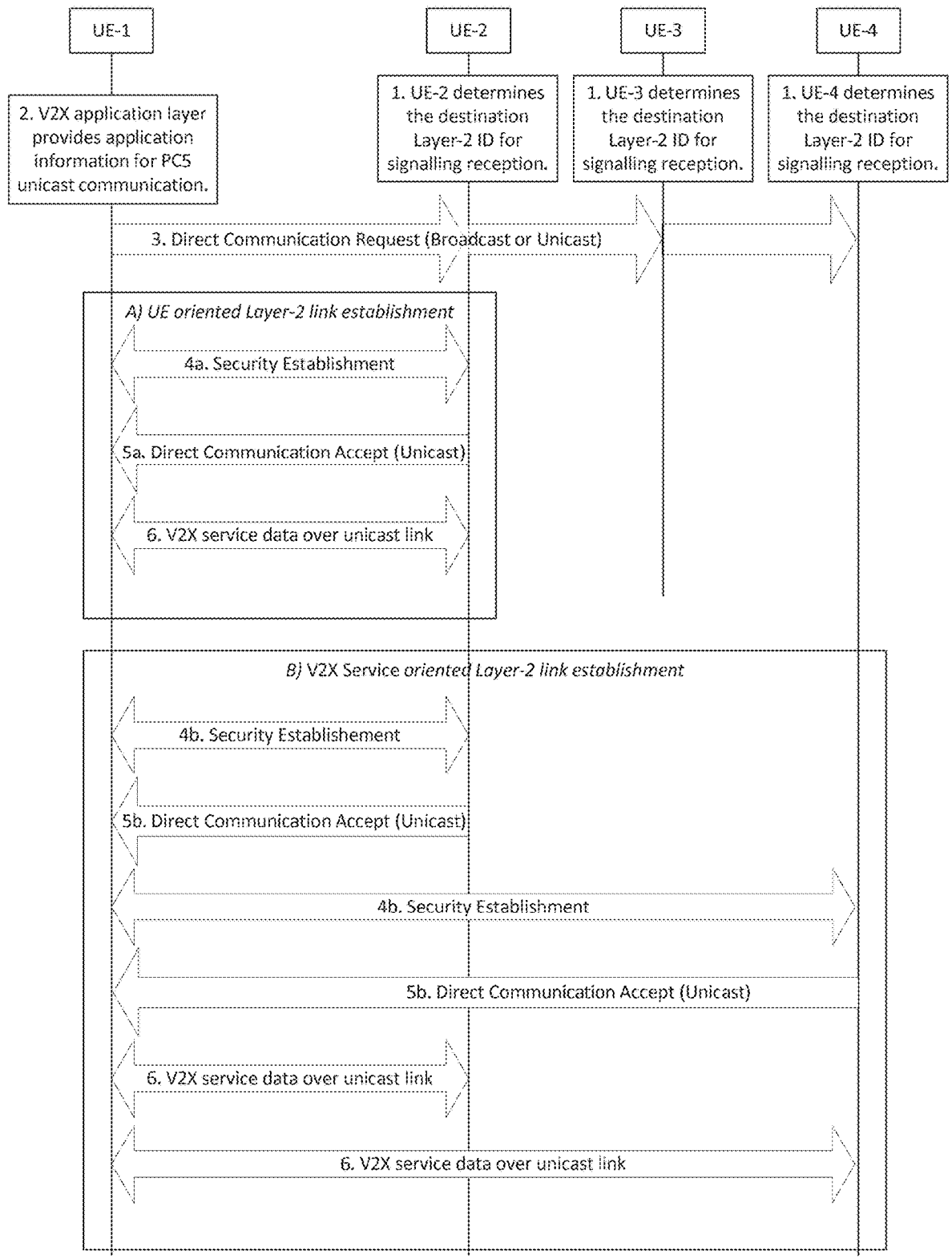
FIG. 6 is a reproduction of FIG. 6.3.3.1-1 of 3GPP 23.287 V16.2.0.

FIG. 6.3.3.1-1 shows the layer-2 link establishment procedure for unicast mode of V2X communication over PC5 reference point.

FIG. 6.3.3.1-1 of 3GPP TS 23.287 V16.2.0,
Entitled "Layer-2 Link Establishment Procedure",
is Reproduced as FIG. 6

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.
2. The V2X application layer in UE-1 provides application information for PC5 unicast communication. The application information includes the V2X service type(s) (e.g. PSID(s) or ITS-AID(s)) of the V2X application and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.
3. UE-1 sends a Direct Communication Request message to initiate the unicast layer-2 link establishment procedure. The Direct Communication Request message includes:

Source User Info: the initiating UE's Application Layer ID (i.e. UE-Vs Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X Service(s) requesting Layer-2 link establishment (e.g. PSID(s) or ITS-AID(s)).

Security Information: the information for the establishment of security.

NOTE 1: The Security Information and the necessary protection of the Source User Info and Target User Info are defined by SA WG3.

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X Service(s) over a PC5 unicast link with UE-1 responds by establishing the security with UE-1.

NOTE 2: The signalling for the Security Procedure is defined by SA WG3.

When the security protection is enabled, UE-1 sends the following information to the target UE:

If IP communication is used:
IP Address Configuration: For IP communication, IP address configuration is required for this link and indicates one of the following values:
"IPv6 Router" if IPv6 address allocation mechanism is supported by the initiating UE, i.e., acting as an IPv6 Router; or
"IPv6 address allocation not supported" if IPv6 address allocation mechanism is not supported by the initiating UE.
Link Local IPv6 Address: a link-local IPv6 address formed locally based on RFC 4862 [21] if UE-1 does not support the IPv6 IP address allocation mechanism, i.e. the IP Address Configuration indicates "IPv6 address allocation not supported".

QoS Info: the information about PC5 QoS Flow(s). For each PC5 QoS Flow, the PFI and the corresponding PC5 QoS parameters (i.e. PQI and conditionally other parameters such as MFBR/GFBR, etc.).

The source Layer-2 ID used for the security establishment procedure is determined as specified in clauses 5.6.1.1 and 5.6.1.4. The destination Layer-2 ID is set to the source Layer-2 ID of the received Direct Communication Request message.

Upon receiving the security establishment procedure messages, UE-1 obtains the peer UE's Layer-2 ID for future communication, for signalling and data traffic for this unicast link.

5. A Direct Communication Accept message is sent to UE-1 by the target UE(s) that has successfully established security with UE-1:

5a. (UE oriented Layer-2 link establishment) If the Target User Info is included in the Direct Communication Request message, the target UE, i.e. UE-2 responds with a Direct Communication Accept message if the Application Layer ID for UE-2 matches.

5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).

The Direct Communication Accept message includes:
Source User Info: Application Layer ID of the UE sending the Direct Communication Accept message.

QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc).

If IP communication is used:
IP Address Configuration: For IP communication, IP address configuration is required for this link and indicates one of the following values:
"IPv6 Router" if IPv6 address allocation mechanism is supported by the target UE, i.e., acting as an IPv6 Router; or
"IPv6 address allocation not supported" if IPv6 address allocation mechanism is not supported by the target UE.
Link Local IPv6 Address: a link-local IPv6 address formed locally based on RFC 4862 [21] if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862 [21].

NOTE 3: When either the initiating UE or the target UE indicates the support of IPv6 router, corresponding address configuration procedure would be carried out after the establishment of the layer 2 link, and the link-local IPv6 addresses are ignored.

The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

6. V2X service data is transmitted over the established unicast link as below:

The PC5 Link Identifier, and PFI are provided to the AS layer, together with the V2X service data.

Optionally in addition, the Layer-2 ID information (i.e. source Layer-2 ID and destination Layer-2 ID) is provided to the AS layer.

NOTE 4: It is up to UE implementation to provide the Layer-2 ID information to the AS layer.

UE-1 sends the V2X service data using the source Layer-2 ID (i.e. UE-1's Layer-2 ID for this unicast link) and the destination Layer-2 ID (i.e. the peer UE's Layer-2 ID for this unicast link).

NOTE 5: PC5 unicast link is bi-directional, therefore the peer UE of UE-1 can send the V2X service data to UE-1 over the unicast link with UE-1.

6.3.3.2 Link Identifier Update for a Unicast Link

FIG. 6.3.3.2-1 shows the link identifier update procedure for a unicast link. Due to the privacy requirements, identifiers used for unicast mode of V2X communication over PC5 reference point (e.g. Application Layer ID, Source Layer-2 ID and IP address/prefix) shall be changed over time as specified in clauses 5.6.1.1 and 5.6.1.4. This procedure is used to update and exchange new identifiers between the source and the peer UEs for a unicast link before using the new identifiers, to prevent service interruptions.

If a UE has multiple unicast links using the same Application Layer IDs or Layer-2 IDs, the UE needs to perform the link identifier update procedure over each of the unicast link.

Figure 7:
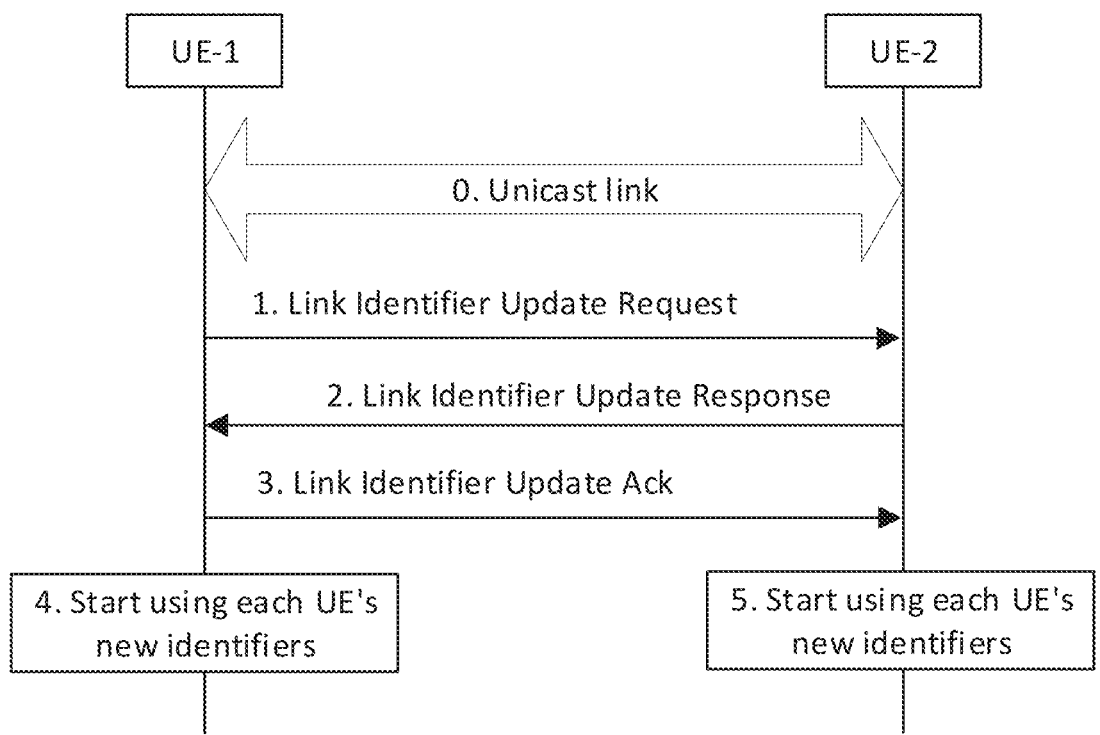
FIG. 7 is a reproduction of FIG. 6.3.3.2-1 of 3GPP TS 23.287 V16.2.0.

FIG. 6.3.3.2-1 of 3GPP TS 23.287 V16.2.0, Entitled "Link Identifier Update Procedure", is Reproduced as FIG. 7

0. UE-1 and UE-2 have a unicast link established as described in clause 6.3.3.1.
1. UE-1 decides to change its identifier(s), e.g. due to the Application Layer ID change or upon expiry of a timer. UE-1 generates its new Layer-2 ID and sends a Link Identifier
   Update Request message to UE-2 using the old identifiers.
   The Link Identifier Update Request message includes the new identifier(s) to use (including the new Layer-2 ID, Security Information, optionally the new Application Layer ID and optionally new IP address/prefix if IP communication is used). The new identifier(s) should be cyphered to protect privacy. After sending the Link Identifier Update request, UE-1 keeps sending data traffic to UE-2 with the old identifiers until UE-1 sends the Link Identifier Update Ack to UE-2.
NOTE 1: The timer is running on per Source Layer-2 ID.
NOTE 2: When one of the two UEs acts as IPv6 router as described in clause 5.2.1.5 and IP address/prefix also need to be changed, corresponding address configuration procedure would be carried out after the Link Identifier update procedure.
2. Upon reception of the Link Identifier Update Request message, based on privacy configuration as specified in clause 5.1.2.1, UE-2 may also decide to change its identifier(s). If UE-2 decides to change its identifier(s), UE-2 responds with a Link Identifier Update Response message which includes the new identifier(s) to use (including the new Layer-2 ID, Security Information, optionally the new Application Layer ID, and optionally a new IP address/prefix if IP communication is used). The new identifier(s) should be cyphered to protect privacy. The Link Identifier Update Response message is sent using the old identifiers. UE-2 continues to receive traffic with the old Layer-2 ID from UE-1 until UE-2 receives traffic with the new Layer-2 ID from UE-1. After sending the Link Identifier Update response, UE-2 keeps sending data traffic to UE-1 with the old identifier until UE-2 receives the Link Identifier Update Ack message from UE-1.
3. Upon reception of the Link Identifier Update Response message, UE-1 responds with a Link Identifier Update Ack message which includes the new identifier(s) from UE-2, as received on the Link Identifier Update Response message. The Link Identifier Update Ack message is sent using the old identifiers. UE-1 continues to receive traffic with the old Layer-2 ID from UE-2 until UE-1 receives traffic with the new Layer-2 ID from UE-2.
4. The V2X layer of UE-1 passes the PC5 Link Identifier for the unicast link and the updated Layer-2 IDs (i.e. new Layer-2 ID for UE-1 for the source and new Layer-2 ID of UE-2 for the destination) down to the AS layer. This enables the AS layer to update the provided Layer-2 IDs for the unicast link.
   UE-1 starts using its new identifiers and UE-2's new identifiers for this unicast link.
5. The V2X layer of UE-2 passes the PC5 Link Identifier for the unicast link and the updated Layer-2 IDs (i.e. new Layer-2 ID of UE-2 for the source and new Layer-2 ID for UE-1 for the destination) down to the AS layer. This enables the AS layer to update the provided Layer-2 IDs for the unicast link.
   UE-2 starts using its new identifiers and UE-1's new identifiers for this unicast link.
NOTE 3: The Security Information in the above messages also needs to be updated at the same time as the Layer-2 IDs. This is defined in TS 33.536 [26].

6.3.3.3 Layer-2 Link Release Over PC5 Reference Point

FIG. 6.3.3.3-1 shows the layer-2 link release procedure over PC5 reference point.

Figure 8:
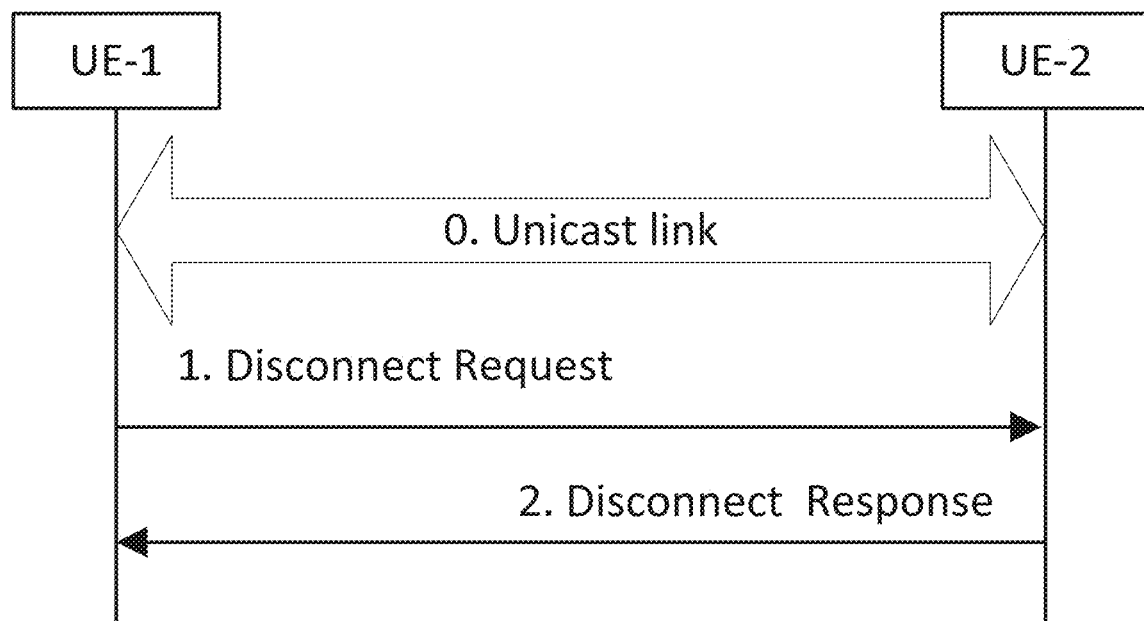
FIG. 8 is a reproduction of FIG. 6.3.3.3-1 of 3GPP TS 23.287 V16.2.0.

FIG. 6.3.3.3-1 of 3GPP TS 23.287 V16.2.0, Entitled "Layer-2 Link Release Procedure", is Reproduced as FIG. 8

0. UE-1 and UE-2 have a unicast link established as described in clause 6.3.3.1.
1. UE-1 sends a Disconnect Request message to UE-2 in order to release the layer-2 link and deletes all context data associated with the layer-2 link.
2. Upon reception of the Disconnect Request message UE-2 may respond with a Disconnect Response message and deletes all context data associated with the layer-2 link.
   The V2X layer of each UE informs the AS layer that the unicast link has been released. The V2X layer uses PC5 Link Identifier to indicate the released unicast link. This enables the AS layer to delete the context related to the released unicast link.

6.3.3.4 Layer-2 Link Modification for a Unicast Link

FIG. 6.3.3.4-1 shows the layer-2 link modification procedure for a unicast link. This procedure is used to:
   add new V2X service(s) to the existing PC5 unicast link.
   remove V2X service(s) from the existing PC5 unicast link.
   add new PC5 QoS Flow(s) in the existing PC5 unicast link.
   modify existing PC5 QoS Flow(s) in the existing PC5 unicast link.
   remove existing PC5 QoS Flow(s) in the existing PC5 unicast link.

Figure 9:
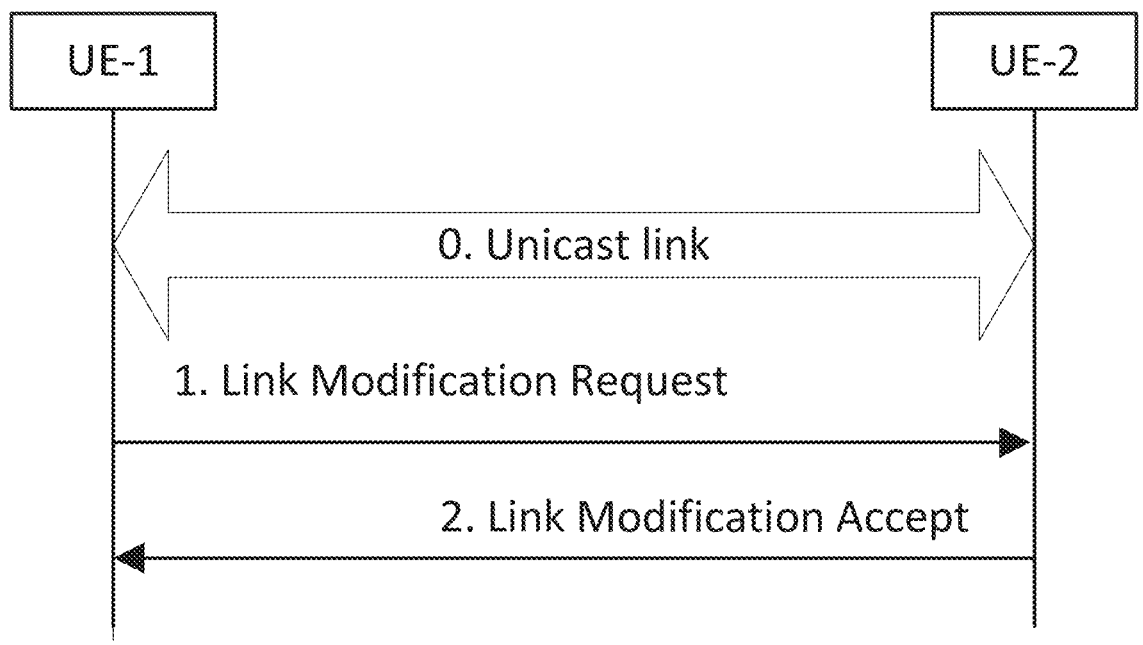
FIG. 9 is a reproduction of FIG. 6.3.3.4-1 of 3GPP TS 23.287 V16.2.0.

FIG. 6.3.3.4-1 of 3GPP TS 23.287 V16.2.0, Entitled "Layer-2 Link Modification Procedure", is Reproduced as FIG. 9

0. UE-1 and UE-2 have a unicast link established as described in clause 6.3.3.1.
1. The V2X application layer in UE-1 provides application information for PC5 unicast communication. The application information includes the V2X service type(s) (e.g. PSID(s) or ITS-AID(s)) of the V2X application(s) and the initiating UE's Application Layer ID. The target UE's Application Layer ID may be included in the application information. If UE-1 decides to reuse the existing PC5 unicast link as specified in clause 5.2.1.4, so decides to modify the unicast link established with UE-2, UE-1 sends a Link Modification Request to UE-2.

The Link Modification Request message includes:
  a) To add new V2X service(s) to the existing PC5 unicast link:
    V2X Service Info: the information about V2X Service(s) to be added (e.g. PSID(s) or ITS-AID(s)).
    QoS Info: the information about PC5 QoS Flow(s) for each V2X Service to be added. For each PC5 QoS Flow, the PFI and the corresponding PC5 QoS parameters (i.e. PQI and conditionally other parameters such as MFBR/GFBR, etc).
  b) To remove a V2X service(s) from the existing PC5 unicast link:
    V2X Service Info: the information about V2X Service(s) to be removed (e.g. PSID(s) or ITS-AID(s)).
  c) To add new PC5 QoS Flow(s) in the existing PC5 unicast link:
    V2X Service Info: the information about V2X Service(s) that needs to add new QoS Flows (e.g. PSID(s) or ITS-AID(s)).
    QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc).
  d) To modify PC5 QoS Flow(s) in the existing PC5 unicast link:
    QoS Info: the information about PC5 QoS Flow(s) to be modified. For each PC5 QoS Flow, the PFI and the corresponding PC5 QoS parameters (i.e. PQI and conditionally other parameters such as MFBR/GFBR, etc.).
  e) To remove PC5 QoS Flow(s) in the existing PC5 unicast link:
    PFIs.
2. UE-2 responds with a Link Modification Accept message.
  The Link Modification Accept message includes:
    For case a), case c) and case d) described in step 1:
      QoS Info: the information about PC5 QoS Flow(s). For each PC5 QoS Flow, the PFI and the corresponding PC5 QoS parameters (i.e. PQI and conditionally other parameters such as MFBR/GFBR, etc).
  The V2X layer of each UE provides information about the unicast link modification to the AS layer. This enables the AS layer to update the context related to the modified unicast link.

6.3.3.5 Layer-2 Link Maintenance Over PC5 Reference Point

The PC5 Signalling Protocol shall support keep-alive functionality that is used to detect if a particular PC5 unicast link is still valid. Either side of the PC5 unicast link can initiate the layer-2 link maintenance procedure (i.e. keep-alive procedure), based on for example triggers from the AS layer or internal timers. The UEs shall minimize the keep-alive signalling, e.g. cancel the procedure if data are successfully received over the PC5 unicast link.

Figure 10:
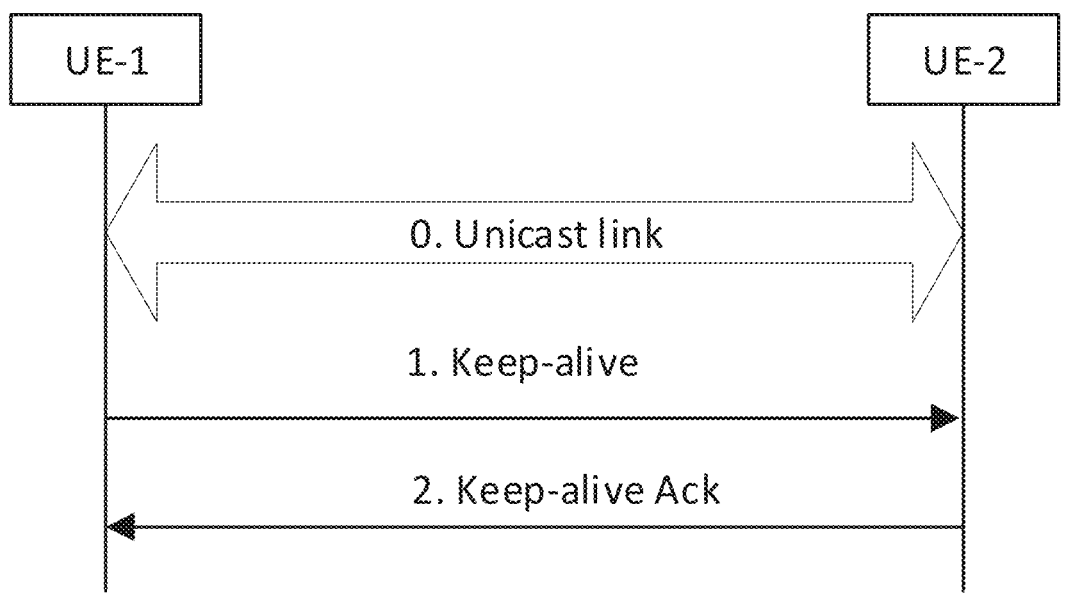
FIG. 10 is a reproduction of FIG. 6.3.3.5-1 of 3GPP TS 23.287 V16.2.0.

FIG. 6.3.3.5-1 of 3GPP TS 23.287 V16.2.0, Entitled "Layer-2 Link Maintenance Procedure", is Reproduced as FIG. 10

0. UE-1 and UE-2 have a unicast link established as described in clause 6.3.3.1.
1. Based on trigger conditions, UE-1 sends a Keep-alive message to UE-2 in order to determine the status of the PC5 unicast link.
   NOTE 1: It is left to Stage 3 to determine the exact triggers for the keep-alive messages. For example, the trigger can be based on a timer associated with the Layer-2 link. The timer can be reset with a successful reception event defined by TS 38.300 [11].
2. Upon reception of the Keep-alive message, UE-2 responds with a Keep-alive Ack message.
The UE initiating the keep-alive procedure shall determine the follow up actions based on the result of the signalling, e.g. proceed with implicit layer-2 link release.
   NOTE 2: It is left to Stage 3 to determine the follow up actions. For example, a successful reception event can also cancel the layer-2 link release if received in time.
3GPP TS 24.587 introduced some procedures related to unicast link communication as follows:
6.1.2.2 PC5 Unicast Link Establishment Procedure
6.1.2.2.1 General
The PC5 unicast link establishment procedure is used to establish a PC5 unicast link between two UEs. The UE sending the request message is called the "initiating UE" and the other UE is called the "target UE". The maximum number of NR PC5 unicast links established in a UE at a time shall not exceed an implementation-specific maximum number of established NR PC5 unicast links.
   NOTE: The recommended maximum number of established NR PC5 unicasts link is 8.
[ ... ]
6.1.2.2.2 PC5 Unicast Link Establishment Procedure Initiation by Initiating UE
[ ... ]
The initiating UE shall meet the following pre-conditions before initiating this procedure:
  a) a request from upper layers to transmit the packet for V2X service over PC5;
  b) the communication mode is unicast mode (e.g. pre-configured as specified in clause 5.2.3 or indicated by upper layers);
  c) the link layer identifier for the initiating UE (i.e. layer-2 ID used for unicast communication) is available (e.g. pre-configured or self-assigned) and is not being used by other existing PC5 unicast links within the initiating UE;
  d) the link layer identifier for the unicast initial signaling (i.e. destination layer-2 ID used for unicast initial signaling) is available to the initiating UE (e.g. pre-configured, obtained as specified in clause 5.2.3 or known via prior V2X communication);
  NOTE: In the case where different V2X services are mapped to distinct default destination layer-2 IDs, when the initiating UE intends to establish a single unicast link that can be used for more than one V2X service types, the UE can select any of the default destination layer-2 ID for unicast initial signaling.
  e) the initiating UE is either authorised for V2X communication over PC5 in NR-PC5 in the serving PLMN, or has a valid authorization for V2X communication over PC5 in NR-PC5 when not served by E-UTRA and not served by NR; and f) there is no existing PC5 unicast link for the pair of peer application layer IDs, or there is an existing PC5 unicast link for the pair of peer application layer IDs and the network layer protocol of the existing PC5 unicast link is not identical to the network layer protocol required by the upper layer in the initiating UE for this V2X service.

g) the number of established PC5 unicast links is less than the implementation-specific maximum number of established NR PC5 unicast links allowed in the UE at a time.

After receiving the service data or request from the upper layers, the initiating UE shall derive the PC5 QoS parameters and assign the PQFI(s) for the PC5 QoS flows(s) to be established as specified in clause 6.1.2.12.

In order to initiate the PC5 unicast link establishment procedure, the initiating UE shall create a DIRECT LINK ESTABLISHMENT REQUEST message. The initiating UE:

a) shall include the source user info set to the initiating UE's application layer ID received from upper layers;

b) shall include the V2X service identifier(s) received from upper layer;

c) shall include the target user info set to the target UE's application layer ID if received from upper layers;

d) shall include the Key establishment information container if the UE PC5 unicast signalling integrity protection policy is set to "signalling integrity protection required" or "signalling integrity protection preferred", and may include the Key establishment information container if the UE PC5 unicast signalling integrity protection policy is set to "signalling integrity protection not needed";

NOTE 1: The Key establishment information container is provided by upper layers.

e) shall include a Nonce_1 set to the 128-bit nonce value generated by the initiating UE for the purpose of session key establishment over this PC5 unicast link if the UE PC5 unicast signalling integrity protection policy is set to "signalling integrity protection required" or "signalling integrity protection preferred";

f) shall include its UE security capabilities indicating the list of algorithms that the initiating UE supports for the security establishment of this PC5 unicast link;

g) shall include the 8 MSBs of $K_{NRP\text{-}sess}$ ID chosen by the initiating UE as specified in 3GPP TS 33.536 [20] if the UE PC5 unicast signalling integrity protection policy is set to "signalling integrity protection required" or "signalling integrity protection preferred";

h) may include a $K_{NRP}$ ID if the initiating UE has an existing $K_{NRP}$ for the target UE; and i) shall include its UE PC5 unicast signalling security policy.

After the DIRECT LINK ESTABLISHMENT REQUEST message is generated, the initiating UE shall pass this message to the lower layers for transmission along with the initiating UE's layer-2 ID for unicast communication and the destination layer-2 ID used for unicast initial signaling, and start timer T5000. The UE shall not send a new DIRECT LINK ESTABLISHMENT REQUEST message to the same target UE identified by the same application layer ID while timer T5000 is running.

NOTE 2: In order to ensure successful PC5 unicast link establishment, T5000 should be set to a value larger than the sum of T5006 and T5007.

Figure 11:
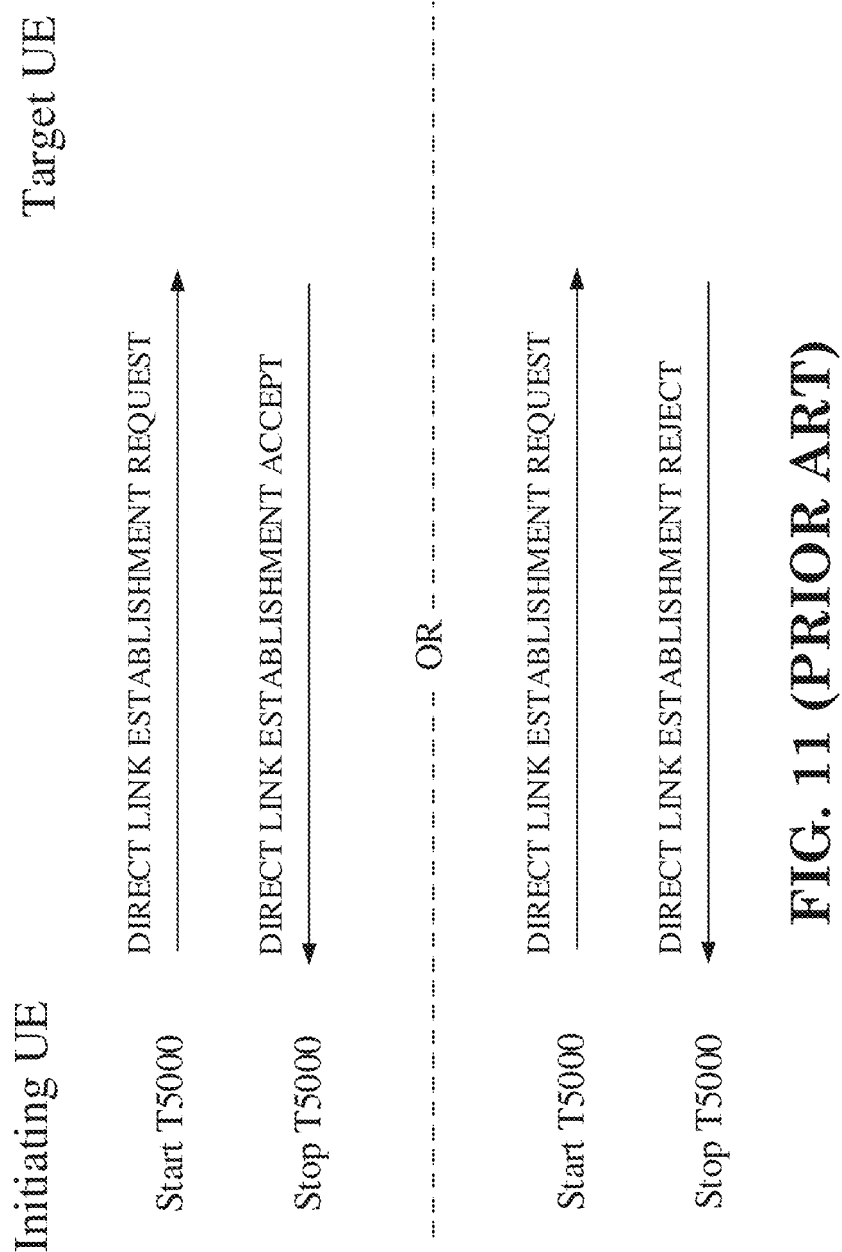
FIG. 11 is a reproduction of FIG. 6.1.2.2.2 of 3GPP TS 24.587 V16.1.0.

FIG. 6.1.2.2.2 of 3GPP TS 24.587 V16.1.0, Entitled "PC5 Unicast Link Establishment Procedure", is Reproduced as FIG. 11

6.1.2.2.3 PC5 Unicast Link Establishment Procedure Accepted by the Target UE

Upon receipt of a DIRECT LINK ESTABLISHMENT REQUEST message, if the target UE accepts this request, the target UE shall uniquely assign a PC5 link identifier, create a PC5 unicast link context and assign a layer-2 ID for this PC5 unicast link. Then the target UE shall store this assigned layer-2 ID and the source layer-2 ID used in the transport of this message provided by the lower layers in the PC5 unicast link context.

If:

a) the target user info IE is included in the DIRECT LINK ESTABLISHMENT REQUEST message and this IE includes the target UE's application layer ID; or b) the target user info IE is not included in the DIRECT LINK ESTABLISHMENT REQUEST message and the target UE is interested in the V2X service(s) identified by the V2X service identifier IE in the DIRECT LINK ESTABLISHMENT REQUEST message;

then the target UE shall either:

a) identify an existing $K_{NRP}$ based on the $K_{NRP}$ ID included in the DIRECT LINK ESTABLISHMENT REQUEST message; or b) if $K_{NRP}$ ID is not included in the DIRECT LINK ESTABLISHMENT REQUEST message, the target UE does not have an existing $K_{NRP}$ for the $K_{NRP}$ ID included in DIRECT LINK ESTABLISHMENT REQUEST message or the target UE wishes to derive a new $K_{NRP}$, derive a new $K_{NRP}$. This may require performing one or more PC5 unicast link authentication procedures as specified in subclause 6.1.2.6.

NOTE: How many times the PC5 unicast link authentication procedure needs to be performed to derive a new $K_{NRP}$ depends on the authentication method used.

After an existing $K_{NRP}$ was identified or a new $K_{NRP}$ was derived, the target UE shall initiate a PC5 unicast link security mode control procedure as specified in subclause 6.1.2.7.

Upon successful completion of the PC5 unicast link security mode control procedure, in order to determine whether the DIRECT LINK ESTABLISHMENT REQUEST message can be accepted or not, in case of IP communication, the target UE checks whether there is at least one common IP address configuration option supported by both the initiating UE and the target UE.

If the target UE accepts the PC5 unicast link establishment procedure, the target UE shall create a DIRECT LINK ESTABLISHMENT ACCEPT message. The target UE:

a) shall include the source user info set to the target UE's application layer ID received from upper layers;

b) shall include a PQFI and the corresponding PC5 QoS parameters;

c) shall include an IP address configuration IE set to one of the following values if IP communication is used:

1) "IPv6 router" if IPv6 address allocation mechanism is supported by the target UE, i.e. acting as an IPv6 router; or 2) "IPv6 address allocation not supported" if IPv6 address allocation mechanism is not supported by the target UE;

d) shall include a link local IPv6 address IE formed locally based on IETF RFC 4862 [16] if IP address configuration IE is set to "IPv6 address allocation not supported" and the received DIRECT LINK ESTABLISHMENT REQUEST message included a link local IPv6 address IE; and e) shall include the configuration of UE PC5 unicast user plane security protection based on the agreed user plane security policy, as specified in 3GPP TS 33.536 [20].

After the DIRECT LINK ESTABLISHMENT ACCEPT message is generated, the initiating UE shall pass this message to the lower layers for transmission along with the initiating UE's layer-2 ID for unicast communication and the target UE's layer-2 ID for unicast communication.

After sending the DIRECT LINK ESTABLISHMENT ACCEPT message, the target UE shall provide the following information along with the layer-2 IDs to the lower layer, which enables the lower layer to handle the coming PC5 signalling or traffic data:

a) the PC5 link identifier self-assigned for this PC5 unicast link; and b) PQFI(s) and its corresponding PC5 QoS parameters.

If the target UE accepts the PC5 unicast link establishment request, then the target UE may perform the PC5 QoS flow establishment over PC5 unicast link as specified in clause 6.1.2.12.

6.1.2.2.4 PC5 Unicast Link Establishment Procedure Completion by the Initiating UE Upon receipt of the DIRECT LINK ESTABLISHMENT ACCEPT message, the initiating UE shall stop timer T5000, uniquely assign a PC5 link identifier and create a PC5 unicast link context for this PC5 unicast link. Then the target UE shall store the source layer-2 ID and the destination layer-2 ID used in the transport of this message provided by the lower layers in the PC5 unicast link context. From this time onward the initiating UE shall use the established link for V2X communication over PC5 and additional PC5 signalling messages to the target UE.

After receiving the DIRECT LINK ESTABLISHMENT ACCEPT message, the initiating UE shall provide the following information along with the layer-2 IDs to the lower layer, which enables the lower layer to handle the coming PC5 signalling or traffic data:

a) the PC5 link identifier self-assigned for this PC5 unicast link; and b) PQFI(s) and its corresponding PC5 QoS parameters.

In addition, the initiating UE may perform the PC5 QoS flow establishment over PC5 unicast link as specified in clause 6.1.2.12.

6.1.2.2.5 PC5 Unicast Link Establishment Procedure not Accepted by the Target UE If the DIRECT LINK ESTABLISHMENT REQUEST message cannot be accepted, the target UE shall send a DIRECT LINK ESTABLISHMENT REJECT message. The DIRECT LINK ESTABLISHMENT REJECT message contains a PC5 signalling protocol cause IE set to one of the following cause values:

1 direct communication to the target UE not allowed;
3 conflict of layer-2 ID for unicast communication is detected;
5 lack of resources for PC5 unicast link; or
111 protocol error, unspecified.

If the target UE is not allowed to accept this request e.g. based on operator policy or configuration parameters for V2X communication over PC5 as specified in clause 5.2.3, the target UE shall send a DIRECT LINK ESTABLISHMENT REJECT message containing PC5 signalling protocol cause value #1 "direct communication to the target UE not allowed".

For a received DIRECT LINK ESTABLISHMENT REQUEST message from a layer-2 ID (for unicast communication), if the target UE already has an existing link established to the UE known to use this layer-2 ID or is currently processing a DIRECT LINK ESTABLISHMENT REQUEST message from the same layer-2 ID, the target UE shall send a DIRECT LINK ESTABLISHMENT REJECT message containing PC5 signalling protocol cause value #3 "conflict of layer-2 ID for unicast communication is detected".

If the PC5 unicast link establishment fails due to the congestion problems, the implementation-specific maximum number of established NR PC5 unicast links has been reached, or other temporary lower layer problems causing resource constraints, the target UE shall send a DIRECT LINK ESTABLISHMENT REJECT message containing PC5 signalling protocol cause value #5 "lack of resources for PC5 unicast link".

For other reasons that causing the failure of link establishment, the target UE shall send a DIRECT LINK ESTABLISHMENT REJECT message containing PC5 signalling protocol cause value #111 "protocol error, unspecified".

Upon receipt of the DIRECT LINK ESTABLISHMENT REJECT message, the initiating UE shall stop timer T5000 and abort the PC5 unicast link establishment procedure. If the PC5 signalling protocol cause value in the DIRECT LINK ESTABLISHMENT REJECT message is #1 "direct communication to the target UE not allowed" or #5 "lack of resources for PC5 unicast link", then the UE shall not attempt to start PC5 unicast link establishment with the same target UE at least for a time period T.

NOTE: The length of time period T is UE implementation specific and can be different for the case when the UE receives PC5 signalling protocol cause value #1 "direct communication to the target UE not allowed" or when the UE receives PC5 signalling protocol cause value #5 "lack of resources for PC5 unicast link".

6.1.2.2.6 Abnormal Cases 6.1.2.2.6.1 Abnormal Cases at the Initiating UE

If timer T5000 expires, the initiating UE shall retransmit the DIRECT LINK ESTABLISHMENT REQUEST message and restart timer T5000. After reaching the maximum number of allowed retransmissions, the initiating UE shall abort the PC5 unicast link establishment procedure and may notify the upper layer that the target UE is unreachable.

NOTE: The maximum number of allowed retransmissions is UE implementation specific.

If the need to establish a link no longer exists before the procedure is completed, the initiating UE shall abort the procedure.

6.1.2.2.6.2 Abnormal Cases at the Target UE

For a received DIRECT LINK ESTABLISHMENT REQUEST message from a source layer-2 ID (for unicast communication), if the target UE already has an existing link established to the UE known to use this source layer-2 ID and the new request contains an identical source user info as the known user, the UE shall process the new request. However, the target UE shall only delete the existing link context after the new link establishment procedure succeeds.

[ . . . ]

6.1.2.6 PC5 Unicast Link Authentication Procedure 6.1.2.6.1 General

The PC5 unicast link authentication procedure is used to perform mutual authentication of UEs establishing a PC5 unicast link and to derive a new $K_{NRP}$ shared between two UEs during a PC5 unicast link establishment procedure or a PC5 unicast link re-keying procedure. After successful completion of the PC5 unicast link authentication procedure, the new $K_{NRP}$ is used for security establishment during the PC5 unicast link security mode control procedure as specified in clause 6.1.2.7. The UE sending the DIRECT LINK AUTHENTICATION REQUEST message is called the "initiating UE" and the other UE is called the "target UE".

6.1.2.6.2 PC5 Unicast Link Authentication Procedure Initiation by the Initiating UE The initiating UE shall meet one of the following preconditions before initiating the PC5 unicast link authentication procedure:
  a) the target UE has initiated a PC5 unicast link establishment procedure toward the initiating UE by sending a DIRECT LINK ESTABLISHMENT REQUEST message and:
    1) the DIRECT LINK ESTABLISHMENT REQUEST message:
      1) includes a target user info IE which includes the application layer ID of the initiating UE; or
      2) does not include a target user info IE and the initiating UE is interested in the V2X service identified by the V2X service identifier in the DIRECT LINK ESTABLISHMENT REQUEST message; and
    2) the $K_{NRP}$ ID is not included in the DIRECT LINK ESTABLISHMENT REQUEST message or the initiating UE does not have an existing $K_{NRP}$ for the $K_{NRP}$ ID included in DIRECT LINK ESTABLISHMENT REQUEST message or the initiating UE wishes to derive a new $K_{NRP}$, derive a new $K_{NRP}$; or
  b) the target UE has initiated a PC5 unicast link re-keying procedure toward the initiating UE by sending a DIRECT LINK REKEYING REQUEST message and the DIRECT LINK REKEYING REQUEST message includes a Re-authentication indication.

In order to initiate the PC5 unicast link authentication procedure, the initiating UE shall create a DIRECT LINK AUTHENTICATION REQUEST message. In this message, the initiating UE:
  a) shall include the Key establishment information container.
  NOTE: The Key establishment information container is provided by upper layers.

After the DIRECT LINK AUTHENTICATION REQUEST message is generated, the initiating UE shall pass this message to the lower layers for transmission along with the initiating UE's layer-2 ID for unicast communication and the target UE's layer-2 ID for unicast communication.

The initiating UE shall start timer T5aaa. The UE shall not send a new DIRECT LINK AUTHENTICATION REQUEST message to the same target UE while timer T5aaa is running.

Figure 12:
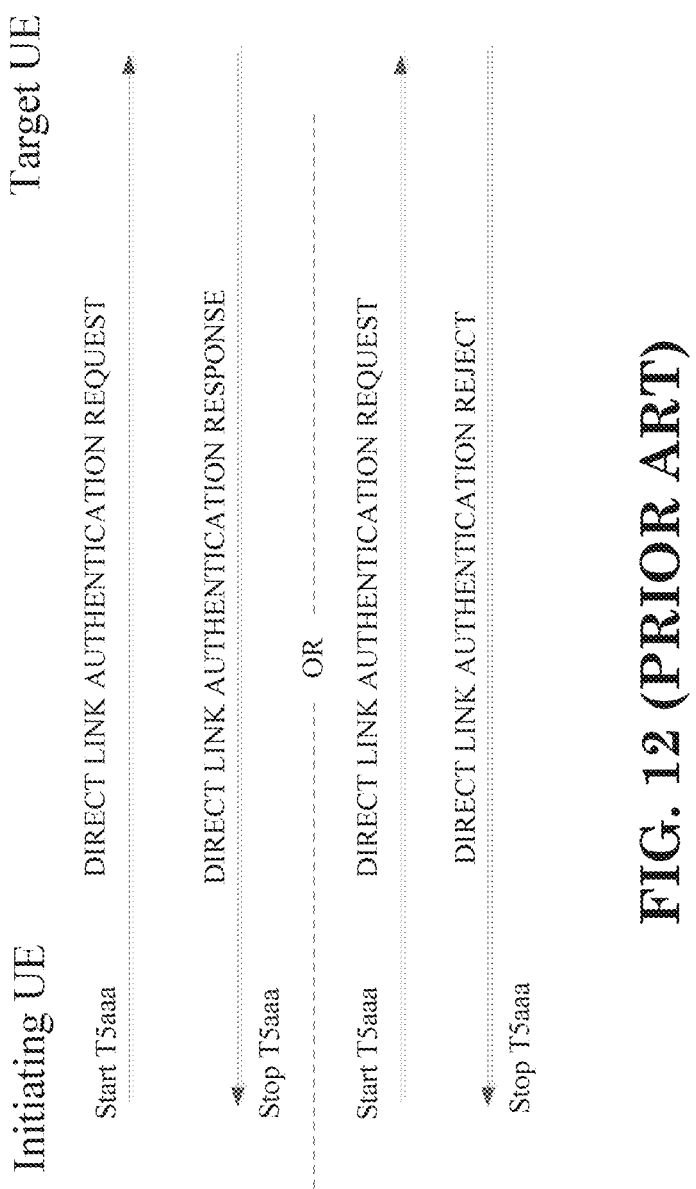
FIG. 12 is a reproduction of FIG. 6.1.2.6.2 of 3GPP TS 24.587 V16.1.0.

FIG. 6.1.2.6.2 of 3GPP TS 24.587 V16.1.0, Entitled "PC5 Unicast Link Authentication Procedure", is Reproduced as FIG. 12

6.1.2.6.3 PC5 unicast link authentication procedure accepted by the target UE

Upon receipt of a DIRECT LINK AUTHENTICATION REQUEST message, if the target UE determines that the DIRECT LINK AUTHENTICATION REQUEST message can be accepted, the target UE shall create a DIRECT LINK AUTHENTICATION RESPONSE message. In this message, the target UE:
  a) shall include the Key establishment information container.
  NOTE: The Key establishment information container is provided by upper layers.

After the DIRECT LINK AUTHENTICATION RESPONSE message is generated, the target UE shall pass this message to the lower layers for transmission along with the target UE's layer-2 ID for unicast communication and the initiating UE's layer-2 ID for unicast communication.

6.1.2.6.4 PC5 Unicast Link Authentication Procedure Completion by the Initiating UE Upon receiving a DIRECT LINK AUTHENTICATION RESPONSE message, the initiating UE shall stop timer T5aaa.

NOTE: When the initiating UE derives the new $K_{NRP}$ during the PC5 unicast link authentication procedure depends on the authentication method in use.

6.1.2.6.5 PC5 Unicast Link Authentication Procedure not Accepted by the Target UE If the DIRECT LINK AUTHENTICATION REQUEST message cannot be accepted, the target UE shall create a DIRECT LINK AUTHENTICATION REJECT message. In this message, the target UE shall include a PC5 signaling protocol cause IE indicating one of the following cause values:
  #a: Authentication failure.

After the DIRECT LINK AUTHENTICATION REJECT message is generated, the target UE shall pass this message to the lower layers for transmission along with the initiating UE's layer-2 ID for unicast communication and the target UE's layer-2 ID for unicast communication. The target UE shall abort the ongoing procedure that triggered the initiation of the PC5 unicast link authentication procedure.

Upon receipt of the DIRECT LINK AUTHENTICATION REJECT message, the initiating UE shall stop timer T5aaa and abort the ongoing procedure that triggered the initiation of the PC5 unicast link authentication procedure.

6.1.2.6.6 Abnormal Cases 6.1.2.6.6.1 Abnormal Cases at the Initiating UE
  a) Timer T5aaa expires.
    The initiating UE shall retransmit the DIRECT LINK AUTHENTICATION REQUEST message and restart timer T5aaa. After reaching the maximum number of allowed retransmissions, the initiating UE shall abort the PC5 unicast link authentication procedure and shall abort the ongoing procedure that triggered the initiation of the PC5 unicast link authentication procedure.
    NOTE: The maximum number of allowed retransmissions is UE implementation specific.
  b) The need to use this PC5 unicast link no longer exists before the PC5 unicast link authentication procedure is completed.
    The initiating UE shall abort the procedure and shall abort the ongoing procedure that triggered the initiation of the PC5 unicast link authentication procedure.

6.1.2.7 PC5 Unicast Link Security Mode Control Procedure 6.1.2.7.1 General

The PC5 unicast link security mode control procedure is used to establish security between two UEs during a PC5 unicast link establishment procedure or a PC5 unicast link re-keying procedure. After successful completion of the PC5 unicast link security mode control procedure, the selected security algorithms and keys are used to integrity protect and cipher all PC5 signalling messages exchanged between the UEs and the security context can be used to protect all PC5 user plane data exchanged between the UEs. The UE sending the DIRECT LINK SECURITY MODE COMMAND message is called the "initiating UE" and the other UE is called the "target UE".

Editor's note: It is FFS whether the user plane is protected by the security association.

6.1.2.7.2 PC5 Unicast Link Security Mode Control Procedure Initiation by the Initiating UE The initiating UE shall meet the following pre-conditions before initiating the PC5 unicast link security mode control procedure:

a) the target UE has initiated a PC5 unicast link establishment procedure toward the initiating UE by sending a DIRECT LINK ESTABLISHMENT REQUEST message and:
  1) the DIRECT LINK ESTABLISHMENT REQUEST message:
    i) includes a target user info IE which includes the application layer ID of the initiating UE; or
    ii) does not include a target user info IE and the initiating UE is interested in the V2X service identified by the V2X service identifier in the DIRECT LINK ESTABLISHMENT REQUEST message; and
  2) the initiating UE has either identified an existing $K_{NRP}$ based on the $K_{NRP}$ ID included in the DIRECT LINK ESTABLISHMENT REQUEST message or derived a new $K_{NRP}$; or
b) the target UE has initiated a PC5 unicast link re-keying procedure toward the initiating UE by sending a DIRECT LINK REKEYING REQUEST message and:
  1) if the target UE has included a Re-authentication indication in the DIRECT LINK REKEYING REQUEST message, the initiating UE has derived a new $K_{NRP}$.

If a new $K_{NRP}$ has been derived by the initiating UE, the initiating UE shall generate the 16 MSBs of $K_{NRP}$ ID to ensure that the resultant $K_{NRP}$ ID will be unique in the initiating UE.

Then the initiating UE shall:
a) generate a 128-bit Nonce_2 value;
b) derive $K_{NRP-sess}$ from $K_{NRP}$, Nonce_2 and Nonce_1 received in the DIRECT LINK ESTABLISHMENT REQUEST message as specified in 3GPP TS 33.536 [yy];
c) derive the NR PC5 encryption key NRPEK and the NR PC5 integrity key NRPIK from $K_{NRP-sess}$ and the selected security algorithms as specified in 3GPP TS 33.536 [yy], and
d) create a DIRECT LINK SECURITY MODE COMMAND message. In this message, the initiating UE:
  1) shall include the Key establishment information container if a new $K_{NRP}$ has been derived at the initiating UE and the authentication method used to generate $K_{NRP}$ requires sending information to complete the authentication procedure;
  NOTE: The Key establishment information container is provided by upper layers.
  2) shall include the MSBs of $K_{NRP}$ ID if a new $K_{NRP}$ has been derived at the initiating UE;
  3) shall include a Nonce_2 set to the 128-bit nonce value generated by the initiating UE for the purpose of session key establishment over this PC5 unicast link;
  4) shall include the selected security algorithms;
  5) shall include the UE security capabilities received from the target UE in the DIRECT LINK ESTABLISHMENT REQUEST message or DIRECT LINK REKEYING REQUEST message; and
  6) shall include the 8 LSBs of $K_{NPR-sess}$ ID chosen by the initiating UE as specified in 3GPP TS 33.536 [yy].

Editor's note: If the PC5 unicast link security mode control procedure was triggered during a PC5 unicast link establishment procedure, whether the initiating UE includes the UE PC5 unicast signalling security policy received from the target UE in the DIRECT LINK ESTABLISHMENT REQUEST message is FFS.

The initiating UE shall form the $K_{NPR-sess}$ ID from the 8 MSBs of $K_{NPR-sess}$ ID received in the DIRECT LINK ESTABLISHMENT REQUEST message or DIRECT LINK REKEYING REQUEST message and the 8 LSBs of $K_{NPR-sess}$ ID included in the DIRECT LINK SECURITY MODE COMMAND message.

The initiating UE shall not cipher the DIRECT LINK SECURITY MODE COMMAND message but shall integrity protect it with the new security context.

After the DIRECT LINK SECURITY MODE COMMAND message is generated, the initiating UE shall pass this message to the lower layers for transmission along with the initiating UE's layer-2 ID for unicast communication and the target UE's layer-2 ID for unicast communication, and start timer T5bbb. The UE shall not send a new DIRECT LINK SECURITY MODE COMMAND message to the same target UE while timer T5bbb is running.

Figure 13:
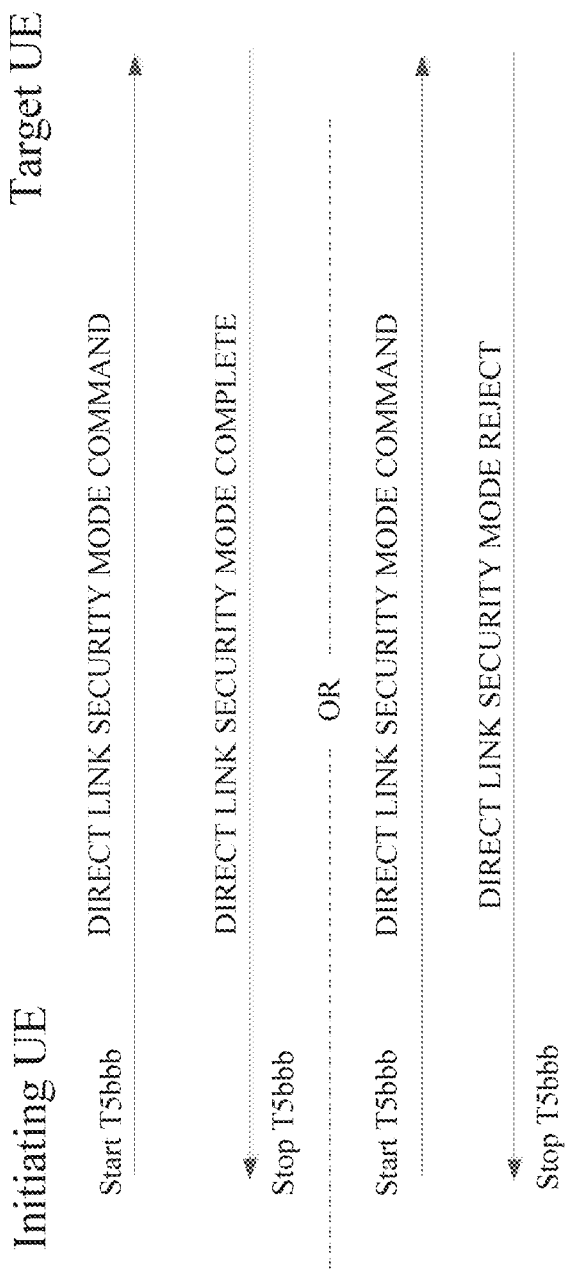
FIG. 13 is a reproduction of FIG. 6.1.2.7.2 of 3GPP TS 24.587 V16.1.0.

FIG. 6.1.2.7.2 of 3GPP TS 24.587 V16.1.0, Entitled "PC5 Unicast Link Security Mode Control Procedure", is Reproduced as FIG. 13

6.1.2.7.3 PC5 unicast link security mode control procedure accepted by the target UE Upon receipt of a DIRECT LINK SECURITY MODE COMMAND message, if the PC5 unicast link security mode control procedure was triggered during a PC5 unicast link establishment procedure, the target UE shall check that the 8 LSBs of $K_{NPR-sess}$ ID included in the DIRECT LINK SECURITY MODE COMMAND message are not set to the same value as those received from another UE in response to the target UE's DIRECT LINK ESTABLISHMENT REQUEST message.

Then the target UE shall:
a) derive $K_{NRP-sess}$ from $K_{NRP}$, Nonce_1 and Nonce_2 received in the DIRECT LINK SECURITY MODE COMMAND message as specified in 3GPP TS 33.536 [yy]; and
b) derive NRPEK and NRPIK from $K_{NRP-sess}$ and the selected security algorithms as specified in 3GPP TS 33.536 [yy].

The target UE shall determine whether or not the DIRECT LINK SECURITY MODE COMMAND message can be accepted by:
a) checking the integrity of the DIRECT LINK SECURITY MODE COMMAND message using NRPIK; and
b) checking that the received UE security capabilities have not been altered compared to the values that the target UE sent to the initiating UE in the DIRECT LINK ESTABLISHMENT REQUEST message or DIRECT LINK REKEYING REQUEST message.

Editor's note: Whether the target UE needs to perform checks related to UE signalling security policy is FFS.

If the target UE did not include a $K_{NRP}$ ID in the DIRECT LINK ESTABLISHMENT REQUEST message, the target UE included a Re-authentication indication in the DIRECT LINK REKEYING REQUEST message or the initiating UE has chosen to derive a new $K_{NRP}$, the target UE shall derive $K_{NRP}$ as specified in 3GPP TS 33.536 [yy]. The target UE shall choose the 16 LSBs of $K_{NRP}$ ID to ensure that the resultant $K_{NRP}$ ID will be unique in the target UE. The target UE shall form $K_{NRP}$ ID from the received MSBs of $K_{NRP}$ ID and its chosen LSBs of $K_{NRP}$ ID and shall store the complete $K_{NRP}$ ID with $K_{NRP}$.

If the target UE accepts the DIRECT LINK SECURITY MODE COMMAND message, the target UE shall create a DIRECT LINK SECURITY MODE COMPLETE message. In this message, the target UE:

a) shall include the PQFI and the corresponding PC5 QoS parameters;
b) if IP communication is used, shall include an IP address configuration IE set to one of the following values:
   1) "IPv6 router" if only IPv6 address allocation mechanism is supported by the target UE, i.e. acting as an IPv6 router; or
   2) "IPv6 address allocation not supported" if IPv6 address allocation mechanism is not supported by the target UE;
c) if IP communication is used and the IP address configuration IE is set to "IPv6 address allocation not supported", shall include a link local IPv6 address IE formed locally based on IETF RFC 4862 [6]; and
d) if a new $K_{NRP}$ was derived, shall include the 16 LSBs of $K_{NRP}$ ID.

Editor's note: Whether the target UE includes its UE PC5 unicast user plane security policy in the DIRECT LINK SECURITY MODE COMPLETE is FFS.

The target UE shall form the $K_{NPR\text{-}sess}$ ID from the 8 MSBs of $K_{NPR\text{-}sess}$ ID it had sent in the DIRECT LINK ESTABLISHMENT REQUEST message or DIRECT LINK REKEYING REQUEST message and the 8 LSBs of $K_{NPR\text{-}sess}$ ID received in the DIRECT LINK SECURITY MODE COMMAND message.

The target UE shall cipher and integrity protect the DIRECT LINK SECURITY MODE COMPLETE message with the new security context.

After the DIRECT LINK SECURITY MODE COMPLETE message is generated, the target UE shall pass this message to the lower layers for transmission along with the target UE's layer-2 ID for unicast communication and the initiating UE's layer-2 ID for unicast communication.

6.1.2.7.4 PC5 Unicast Link Security Mode Control Procedure Completion by the Initiating UE Upon receiving a DIRECT LINK SECURITY MODE COMPLETE message, the initiating UE shall stop timer T5bbb and check the integrity of the DIRECT LINK SECURITY MODE COMPLETE message. If the integrity check passes, the initiating UE shall then continue the procedure which triggered the PC5 unicast link security mode control procedure.

6.1.2.7.5 PC5 Unicast Link Security Mode Control Procedure not Accepted by the Target UE If the DIRECT LINK SECURITY MODE COMMAND message cannot be accepted, the target UE shall send a DIRECT LINK SECURITY MODE REJECT message and abort the ongoing procedure that triggered the initiation of the PC5 unicast link security mode control procedure. The DIRECT LINK SECURITY MODE REJECT message contains a PC5 signalling protocol cause IE indicating one of the following cause values:

a: Authentication failure;
b: Integrity failure;
c: UE security capabilities mismatch;
d: LSBs of $K_{NPR\text{-}sess}$ ID conflict; or
111: Protocol error, unspecified.

Editor's note: Whether a PC5 signalling protocol cause value for UE PC5 unicast signalling security policy mismatch is needed is FFS.

Upon receipt of the DIRECT LINK SECURITY MODE REJECT message, the initiating UE shall stop timer T5bbb and:

a) if the PC5 signalling protocol cause IE in the DIRECT LINK SECURITY MODE REJECT message is set to #e, retransmit the DIRECT LINK SECURITY MODE COMMAND message with a different value for the 8 LSBs of $K_{NPR\text{-}sess}$ ID; and
b) otherwise, abort the ongoing procedure that triggered the initiation of the PC5 unicast link security mode control procedure.

6.1.2.7.6 Abnormal Cases 6.1.2.7.6.1 Abnormal Cases at the Initiating UE a) Timer T5bbb expires.
   The initiating UE shall retransmit the DIRECT LINK SECURITY MODE COMMAND message and restart timer T5bbb. After reaching the maximum number of allowed retransmissions, the initiating UE shall abort the PC5 unicast link security mode control procedure and shall abort the ongoing procedure that triggered the initiation of the PC5 unicast link security mode control procedure.

NOTE: The maximum number of allowed retransmissions is UE implementation specific.

b) The need to use this PC5 unicast link no longer exists before the PC5 unicast link security mode control procedure is completed.
   The initiating UE shall abort the procedure and shall abort the ongoing procedure that triggered the initiation of the PC5 unicast link security mode control procedure.

7.3.2 Direct Link Establishment Accept 7.3.2.1 Message Definition

This message is sent by a UE to another peer UE to accept the received DIRECT LINK ESTABLISHMENT REQUEST message. See table 7.3.2.1.1.

Message type: DIRECT LINK ESTABLISHMENT ACCEPT

Significance: dual

Direction: UE to peer UE

Table 7.3.2.1.1 of 3GPP TS 24.587 V16.1.0, Entitled "DIRECT LINK ESTABLISHMENT ACCEPT Message Content", is Reproduced as FIG. 14

[ . . . ]

7.3.14 Direct Link Security Mode Complete 7.3.14.1 Message Definition

This message is sent by a UE to another peer UE to respond to a DIRECT LINK SECURITY MODE COMMAND message. See table 7.3.14.1.1.

Message type: DIRECT LINK SECURITY MODE COMPLETE

Significance: dual

Direction: UE to peer UE

Table 7.3.14.1.1 of 3GPP TS 24.587 V16.1.0, Entitled "D DIRECT LINK SECURITY MODE COMPLETE Message Content", is Reproduced as FIG. 15

3GPP TR 23.752 introduces the following:
5.3 Key Issue #3: Support of UE-to-Network Relay
5.3.1 General Description
According to TS 22.261 [3] and TS 22.278 [2], support for UE-to-Network Relay needs to be studied. In addition, the Rel-16 5G architectural design (e.g. flow-based QoS communication over PC5/Uu interface) shall be taken into consideration as well.
The case that UE may be able to access to network via the direct network communication or the indirect network communication illustrated in FIG. 5.3.1-1 needs to be considered, where path #1 is direct network communication path that may not exist, as well as path #2 and path #3 are indirect network communication paths via different UE-to-Network Relays.

Figure 16:
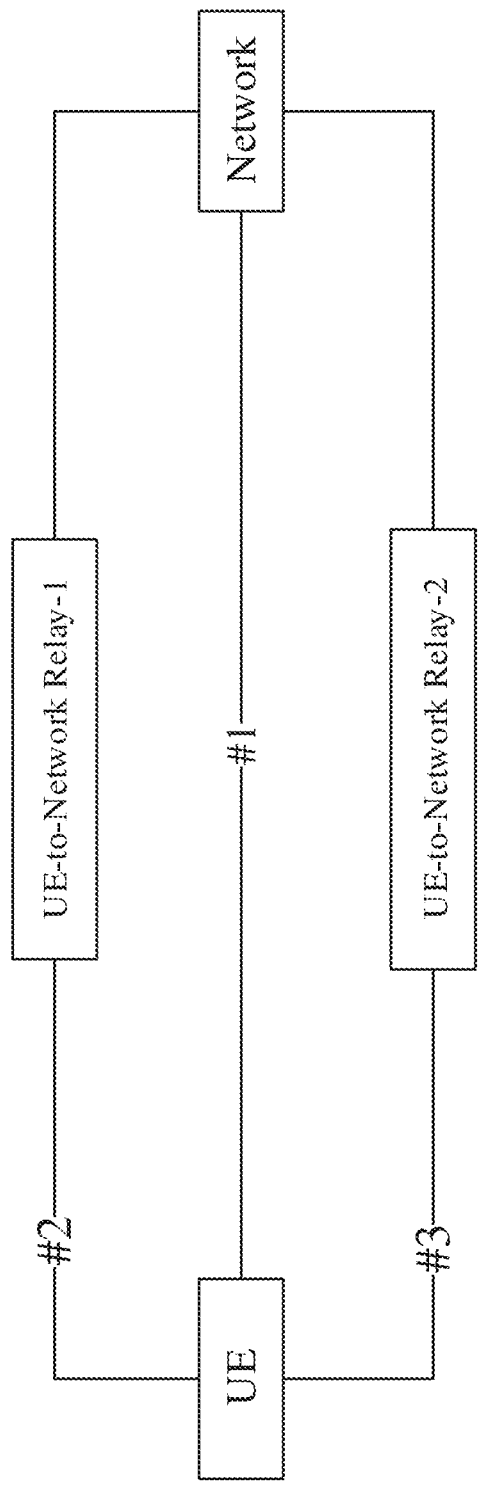
FIG. 16 is a reproduction of FIG. 5.3.1-1 of 3GPP TR 23.752 V0.5.0.

FIG. 5.3.1-1 of 3GPP TR 23.752 V0.5.0, Entitled "Example Scenario of Direct or Indirect Network Communication Path Between UE and Network", is Reproduced as FIG. 16

Therefore, 5G ProSe needs to support UE-to-Network Relay. In particular, the following aspects need to be studied:
  How to authorize a UE to be a 5G UE-to-Network Relay and how to authorize a UE to access 5GC via a 5G UE-to-Network Relay.
  How to establish a connection between Remote UE and a UE-to-Network Relay to support connectivity to the network for the Remote UE.
  How to support end-to-end requirements between Remote UE and the network via a UE-to-Network Relay, including QoS (such as data rate, reliability, latency) and the handling of PDU Session related attributes (e.g. S-NSSAI, DNN, PDU Session Type and SSC mode).
  How the network allows and controls the QoS requirement for 5G ProSe UE-to-NW relay.
  How to transfer data between the Remote UE and the network over the UE-to-Network Relay.
  NOTE 1: Security and privacy aspects will be handled by SA WG3.
  How to (re)select a UE-to-Network Relay for communication path selection between two indirect network communication paths (i.e. path #2 and path #3 in FIG. 5.3.1-1).
  How to perform communication path selection between a direct network communication path (i.e. path #1 in FIG. 5.3.1-1) and an indirect network communication path (i.e. path #2 or path #3 in FIG. 5.3.1-1).
  How to guarantee service continuity during these communication path switch procedures for switching between a direct network communication path and an indirect communication path, as well as for switching between two indirect network communication paths.
  NOTE 2: Support of non-unicast mode communication (i.e. one-to-many communication/broadcast or multicast) between network and UE-to-Network Relay UE and between UE-to-Network Relay and Remote UE(s) depends on the result of FS_5MBS work.
Two cases can be considered regarding support of UE-to-Network Relay, i.e. UE-to-Network Relay served by gNB as shown in FIG. 5.3.1-2 and UE-to-Network Relay served by ng-eNB as shown in FIG. 5.3.1-3.

Figure 17:
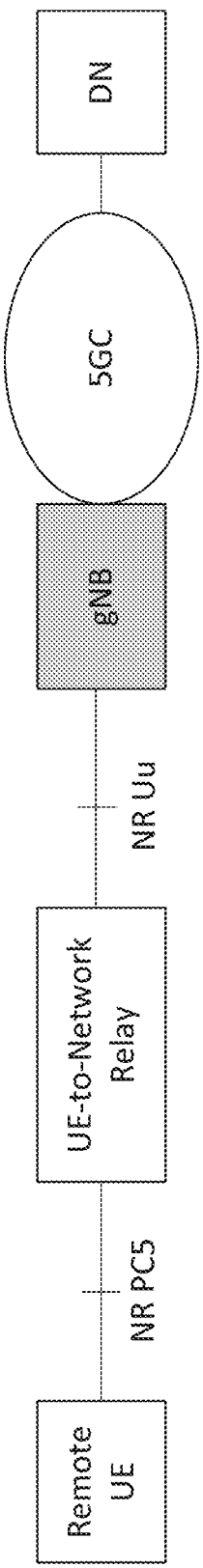
FIG. 17 is a reproduction of FIG. 5.3.1-2 of 3GPP TR 23.752 V0.5.0.

FIG. 5.3.1-2 of 3GPP TR 23.752 V0.5.0, Entitled "UE-to-Network Relay Served by gNB", is Reproduced as FIG. 17

Figure 18:
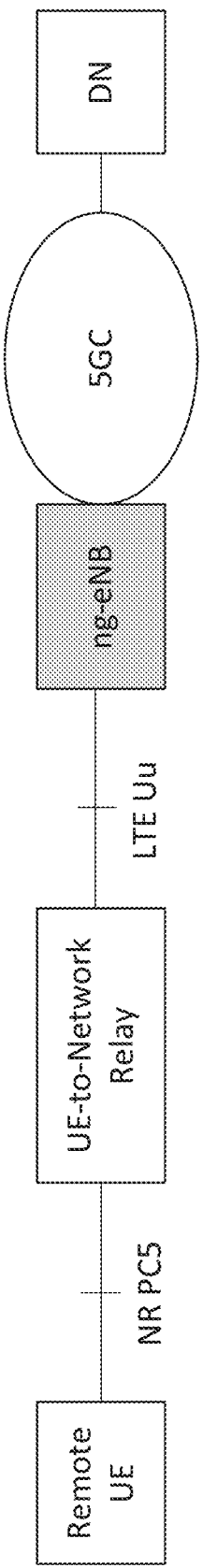
FIG. 18 is a reproduction of FIG. 5.3.1-3 of 3GPP TR 23.752 V0.5.0.

FIG. 5.3.1-3 of 3GPP TR 23.752 V0.5.0, Entitled "UE-to-Network Relay Served by Ng-eNB", is Reproduced as FIG. 18

NOTE 3: Whether to support the case that a UE-to-Network Relay is served by ng-eNB depends on solution to be identified in this study and RAN decision.
  NOTE 4: When UE-to-Network Relay moves to E-UTRAN, LTE PC5 based ProSe UE-to-Network Relay can be supported as defined TS 23.303 [9] for Public Safety.
[ . . . ]
  6.6 Solution #6: Layer-3 UE-to-Network Relay
  6.6.1 Description
This is a solution for key issue #3, UE-to-Network Relay. The ProSe 5G UE-to-Network Relay entity provides the functionality to support connectivity to the network for Remote UEs (see FIG. 6.6.1-1). It can be used for both public safety services and commercial services (e.g. interactive service).
A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage.
Remote UE may perform communication path selection between direct Uu path and indirect Uu path based on the link quality and the configured threshold (pre-configured or provided by NG-RAN). For example, if Uu link quality exceeds configured threshold, the direct Uu path is selected. Otherwise, the indirect Uu path is selected by performing the UE-to-Network Relay discovery and selection.

Figure 19:
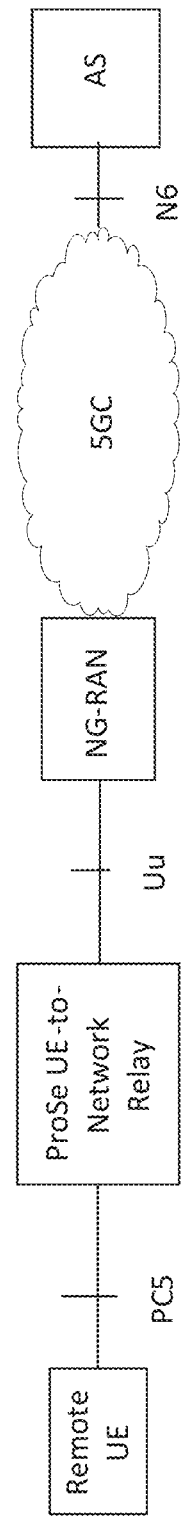
FIG. 19 is a reproduction of FIG. 6.6.1-1 of 3GPP TR 23.752 V0.5.0.

FIG. 6.6.1-1 of 3GPP TR 23.752 V0.5.0, Entitled "Architecture Model Using a ProSe 5G UE-to-Network Relay", is Reproduced as FIG. 19

The ProSe 5G UE-to-Network Relay shall relay unicast traffic (UL and DL) between the Remote UE and the network. The ProSe UE-to-Network Relay shall provide generic function that can relay any IP, Ethernet or Unstructured traffic;
  For IP traffic over PC5 reference point, the ProSe UE-to-Network Relay uses IP type PDU Session towards 5GC.
  For Ethernet traffic over PC5 reference point, the ProSe UE-to-Network Relay can use Ethernet type PDU Session or IP type PDU Session towards 5GC.
  For Unstructured traffic over PC5 reference point, the ProSe UE-to-Network Relay can use Unstructured type PDU Session or IP type PDU Session (i.e. IP encapsulation/de-capsulation by UE-to-Network Relay) towards 5GC.
The type of traffic supported over PC5 reference point is indicated by the ProSe UE-to-Network Relay e.g. using the corresponding Relay Service Code. The UE-to-Network Relay determines the PDU Session Type based on, e.g. ProSe policy/parameters, URSP rule, Relay Service Code, etc.

NOTE: How the UE-to-NW relay determines PDU session type should be evaluated independent from other part of this solution while considering other PDU session parameters, e.g. DNN, SSC mode.

IP type PDU Session and Ethernet type PDU Session can be used to support more than one Remote UEs while Unstructured type PDU Session can be used to support only one Remote UE.

Editor's note: Support of non-unicast mode communication (i.e. one-to-many communication/broadcast or multicast) between network and UE-to-Network Relay UE and between UE-to-Network Relay and Remote UE(s) depends on the result of FS_5MBS work.

One-to-one Direct Communication is used between Remote UEs and ProSe 5G UE-to-Network Relays for unicast traffic as specified in solutions for Key Issue #2.

The protocol stack for Layer-3 UE-to-Network Relays is shown in FIG. 6.6.1-2.

Figure 20:
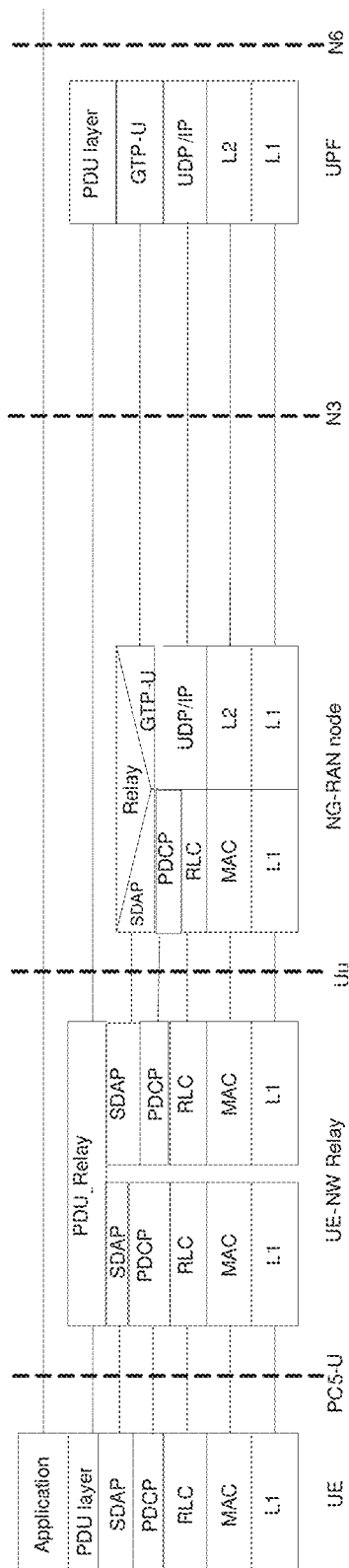
FIG. 20 is a reproduction of FIG. 6.6.1-2 of 3GPP TR 23.752 V0.5.0.

FIG. 6.6.1-2 of 3GPP TR 23.752 V0.5.0, Entitled "Protocol Stack for ProSe 5G UE-to-Network Relay", is Reproduced as FIG. 20

Hop-by-hop security is supported in the PC5 link and Uu link. If there are requirements beyond hop-by-hop security for protection of Remote UE's traffic, security over PDU layer needs to be applied.

Further security details (integrity and privacy protection for remote UE-Nw communication) will be specified in SA WG3.

According to the definition of service continuity in TS 22.261 [3] and TS 23.501 [6], it can be seen that "service continuity" is different from "session continuity" by definition, and service continuity can be achieved at application layer regardless of IP address preservation:

For Mission Critical Service in Public Safety, service continuity can be achieved by the application layer mechanism, e.g. as described in Annex B in TS 23.280 [29].

For commercial IMS use cases, service continuity can be achieved using mechanisms described in TS 23.237 [30].

For commercial use cases with application layer out of 3GPP scope (e.g. non IMS), service continuity can be achieved using similar way, e.g. QUIC.

It is noted that all of the above application layer mechanisms can be reused for Layer-3 UE-to-Network Relay without any enhancements in this study item.

6.6.2 Procedures

A ProSe 5G UE-to-Network Relay capable UE may register to the network (if not already registered) and establish a PDU session enabling the necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

Figure 21:
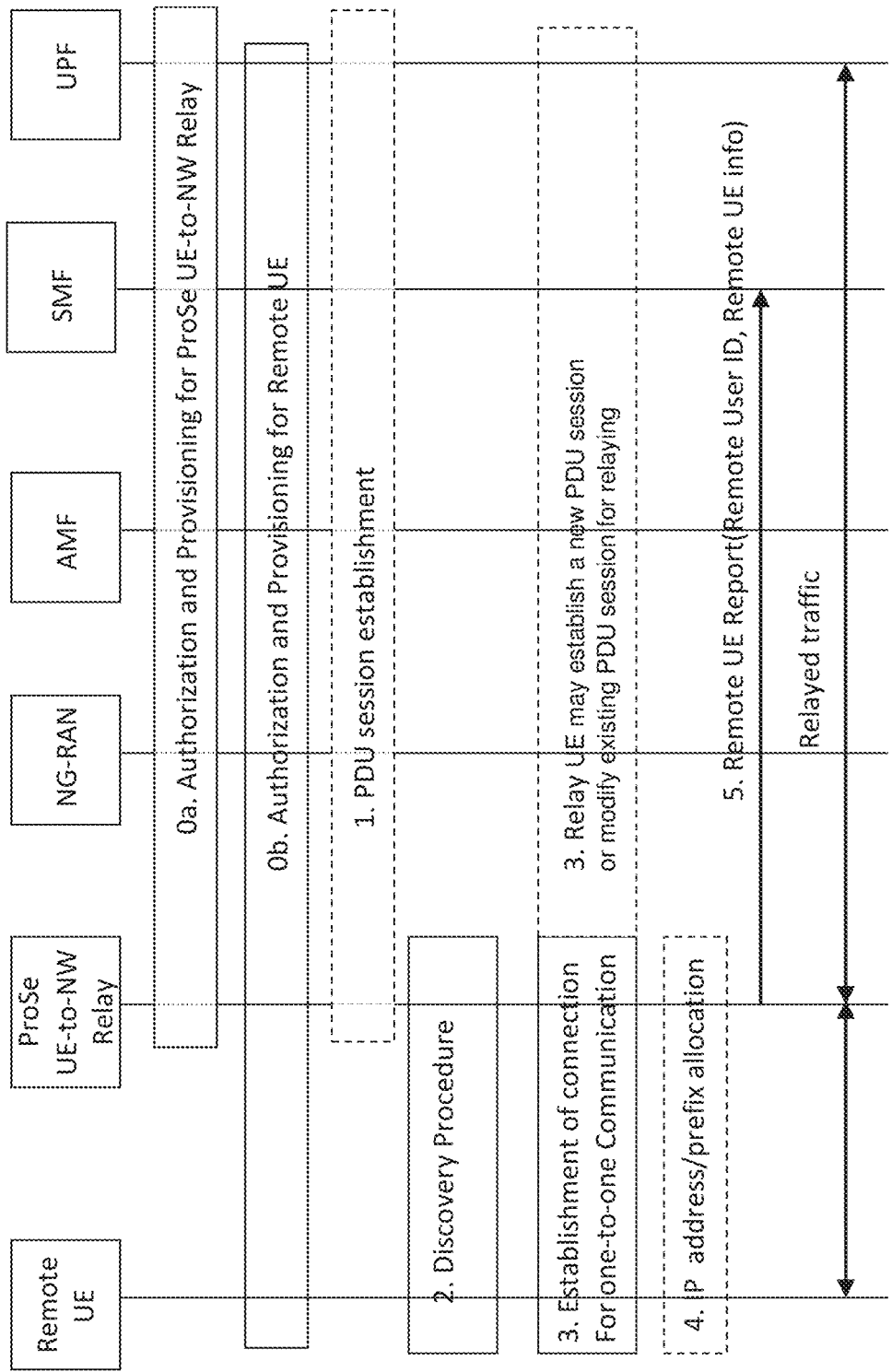
FIG. 21 is a reproduction of FIG. 6.6.2-1 of 3GPP TR 23.752 V0.5.0.

FIG. 6.6.2-1 of 3GPP TR 23.752 V0.5.0, Entitled "ProSe 5G UE-to-Network Relay", is Reproduced as FIG. 21

0. During the Registration procedure, Authorization and provisioning is performed for the ProSe UE-to-NW relay (0a) and Remote UE (0b). Authorization and provisioning procedure may be any solution for key issue #1 and #3.

1. The ProSe 5G UE-to-Network Relay may establish a PDU session for relaying with default PDU session parameters received in step 0 or pre-configured in the UE-to-NW relay, e.g. S-NSSAI, DNN, SSC mode or PDU Session Type. In case of IP PDU Session Type and IPv6, the ProSe UE-to-Network Relay obtains the IPv6 prefix via prefix delegation function from the network as defined in TS 23.501 [6].

2. Based on the Authorization and provisioning in step 0, the Remote UE performs discovery of a ProSe 5G UE-to-Network Relay using any solution for key issue #1 and #3. As part of the discovery procedure the Remote UE learns about the connectivity service the ProSe UE-to-Network Relay provides.

3. The Remote UE selects a ProSe 5G UE-to-Network Relay and establishes a connection for One-to-one ProSe Direct Communication as described in TS 23.287 [5].

If there is no PDU session satisfying the requirements of the PC5 connection with the remote UE, e.g. S-NSSAI, DNN, QoS, the ProSe 5G UE-to-Network Relay initiates a new PDU session establishment or modification procedure for relaying.

According to the PDU Session Type for relaying, the ProSe 5G UE-to-Network Relay performs relaying function at the corresponding layer, e.g. acts as an IP router when the traffic type is IP, acts as an Ethernet switch when the traffic type is Ethernet, and performs generic forwarding for Unstructured traffic.

When the ProSe 5G UE-to-Network Relay uses Unstructured PDU session type for Unstructured traffic over PC5 reference point, it creates a mapping between the PC5 Link Identifier and the PDU Session ID, and a mapping between PFI for PC5 L2 link and the QFI for the PDU Session.

When the ProSe 5G UE-to-Network Relay uses IP PDU session type for Ethernet or Unstructured traffic over PC5 reference point, it locally assigns an IP address/prefix for the Remote UE and use that to encapsulate the data from the Remote UE. For downlink traffic, the ProSe 5G UE-to-Network Relay decapsulates the traffic from the IP headers and forwards to the corresponding Remote UE via PC5 reference point.

Editor's note: How the ProSe UE-to-NW relay determine the requirement of PC5 Connection, e.g. S-NSSAI, DNN, QoS will be specified in other solutions for KI #3.

Editor's note: How to support end-to-end QoS requirement of Remote UE, including QoS enforcement for PC5 and PDU session for relaying is addressed in other solutions.

4. For IP PDU Session Type and IP traffic over PC5 reference point, IPv6 prefix or IPv4 address is allocated for the remote UE as it is defined in TS 23.303 [9] clauses 5.4.4.2 and 5.4.4.3. From this point the uplink and downlink relaying can start. For downlink traffic forwarding, the PC5 QoS Rule is used to map the downlink IP packet to the PC5 QoS Flow. For uplink traffic forwarding, the 5G QoS Rule is used to map the uplink IP packet to the Uu QoS Flow.

Editor's note: General functionality for IPv6 prefix delegation as defined in TS 23.401 [25] clause 5.3.1.2.6 needs to be added in 5GS and reference to TS 23.501 [6] can be added above.

5. The ProSe 5G UE-to-Network Relay sends a Remote UE Report (Remote User ID, Remote UE info) message to the SMF for the PDU session associated with the relay. The Remote User ID is an identity of the Remote UE user (provided via User Info) that was successfully connected in step 3. The Remote UE info is used to assist identifying the Remote UE in the 5GC. For IP PDU Session Type, the Remote UE info is Remote UE IP info. For Ethernet PDU Session Type, the Remote UE info is Remote UE MAC address which is detected by the UE-to-Network Relay. For Unstructured PDU Session Type, the Remote UE info contains the PDU session ID. The SMF stores the Remote User IDs and the related Remote UE info (if available) in the ProSe 5G UE-to-Network Relay's SM context for this PDU session associated with the relay.

For IP info the following principles apply:
- for IPv4, the UE-to-network Relay shall report TCP/UDP port ranges assigned to individual Remote UE(s) (along with the Remote User ID);
- for IPv6, the UE-to-network Relay shall report IPv6 prefix(es) assigned to individual Remote UE(s) (along with the Remote User ID).

Editor's note: The privacy protection for Remote User ID depends on SA WG3 design.

The Remote UE Report message shall be sent when the Remote UE disconnects from the ProSe 5G UE-to-Network Relay (e.g. upon explicit layer-2 link release or based on the absence of keep alive messages over PC5) to inform the SMF that the Remote UE(s) have left.

In the case of Registration Update procedure involving SMF change the Remote User IDs and related Remote UE info corresponding to the connected Remote UEs are transferred to the new SMF as part of SM context transfer for the ProSe 5G UE-to-Network Relay.

NOTE 1: In order for the SMF to have the Remote UE(s) information, the HPLMN and the VPLMN where the ProSe 5G UE-to-Network Relay is authorised to operate, needs to support the transfer of the Remote UE related parameters in case the SMF is in the HPLMN.

NOTE 2: When Remote UE(s) disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing the measurement of the signal strength of PC5 unicast link with the ProSe 5G UE-to-Network Relay for relay reselection.

The solution can also work when the ProSe 5G UE-to-Network Relay UE connects in EPS using LTE. In this case for the Remote UE report the procedures defined in TS 23.303 [9] can be used.

Editor's note: How to perform the rate limitation for remote UE is FFS.

6.6.3 Impacts on Services, Entities and Interfaces

The solution has impacts in the following entities:

SMF:
Needs to support procedures for Remote UE report.

UE:
Needs to support procedures for Remote UE and ProSe 5G UE-to-Network Relay.

[ . . . ]

6.23 Solution #23: End-to-End Security and IP Address Preservation for Layer-3 UE-to-Network Relay Using N3IWF 6.23.1 General Description This is a solution to support end-to-end security for Remote UE traffic transmitted using Layer-3 UE-to-Network Relay. It can be used for both public safety services and commercial services (e.g. interactive service). The solution is optional and complementary to base line Layer-3 UE-to-Network Relay solutions, e.g. as described in clause 6.6. It can be used by the Remote UE for the services that requires end-to-end traffic confidentiality and/or IP address preservation.

To provide end-to-end security for the remote UE traffic, the design of "untrusted non-3GPP access to 5GC via N3IWF" in clause 4.2.8 of TS 23.501 [6] or "Access to PLMN services via stand-alone non-public networks" in clause 5.30.2.7 of TS 23.501 [6] is leveraged. Remote UE follows the procedures defined in TS 23.502 [8] clause 4.12 to register to 5GC via N3IWF and establish corresponding PDU sessions. The data traffic over the PDU sessions are protected by IPSec between the Remote UE and N3IWF.

To provide IP address preservation, remote UE follows the procedure specified in TS 23.502 [8] clause 4.9.2 (Handover of a PDU Session procedure between 3GPP and untrusted non-3GPP access) when UE moves between direct network communication and indirect communication path.

The N3IWF provides NAS connectivity to the 5GC and end-to-end security for Remote UEs (see FIG. 6.23.1-1) via UE-to-NW Relay Access. The N3IWF treats the Remote UE as any N3GPP UE, i.e. there is no impact on N3IWF.

Remote UE supports the PC5 procedures as defined in solution #6 in clause 6.6 for obtaining UE-to-NW Relay access.

Figure 22:
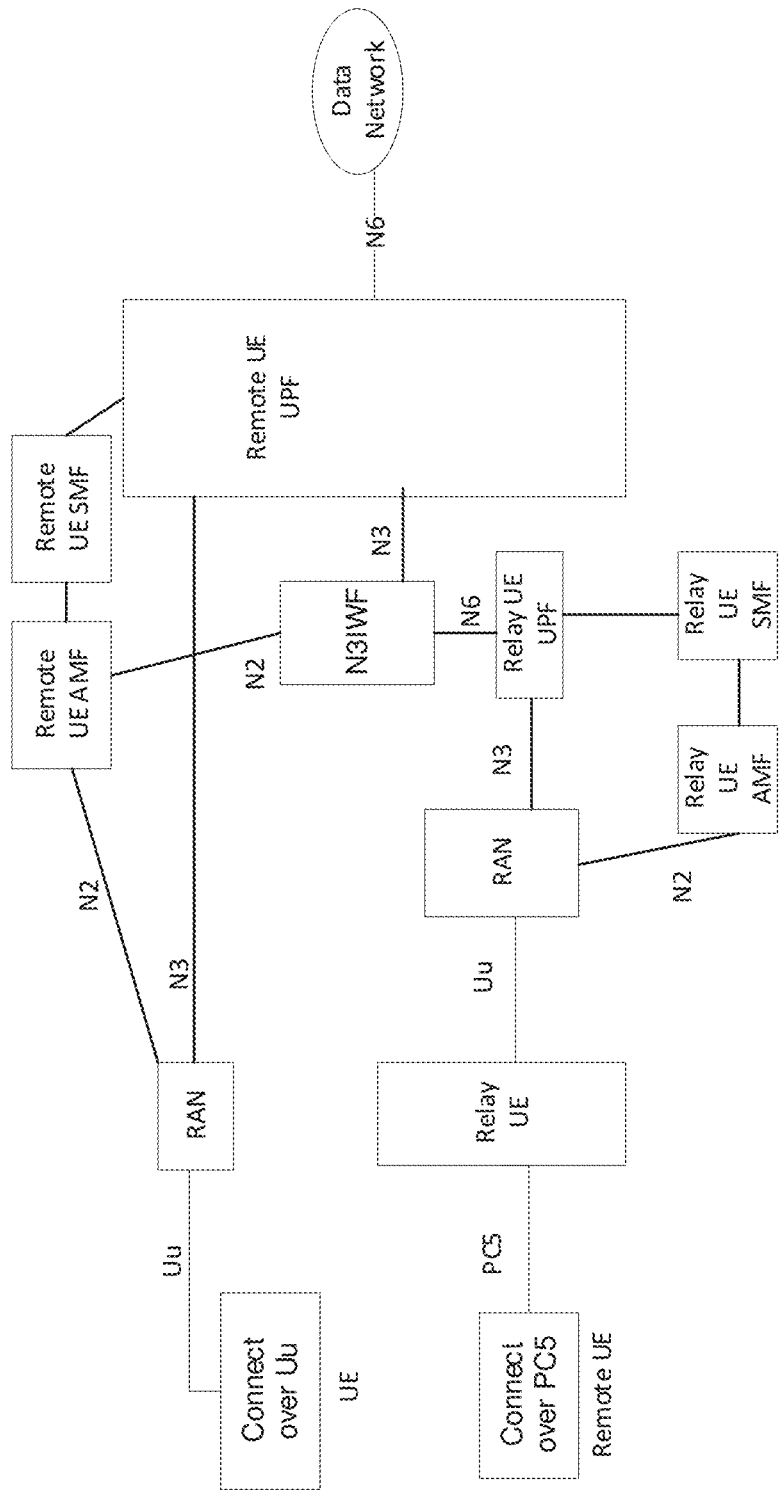
FIG. 22 is a reproduction of FIG. 6.23.1-1 of 3GPP TR 23.752 V0.5.0.

FIG. 6.23.1-1 of 3GPP TR 23.752 V0.5.0, Entitled "Non-Roaming Architecture Model Using N3IWF with UE-to-NW Relay Access", is Reproduced as FIG. 22

Since this solution is optional, not all UE-to-Network Relay provides the PDU session to access to N3IWF.

Editor's note: The criteria and policies used by a Remote UE to decide between a secure N3IWF or otherwise need to be defined.

Editor's note: The criteria and policies used by a UE-to-Network Relay to offer secure N3IWF access or otherwise need to be defined.

UE selection of the N3IWF follows the regulatory rules of the country where it is located, and when required by the regulations the Remote UE only selects a N3IWF within the local country. QoS differentiation can be provided on per-IPsec Child Security Association basis. N3IWF determines the IPsec child SAs as defined in TS 23.502 [8] clause 4.12. The N3IWF is preconfigured to allocate different IPsec child SAs for QoS Flows with different QoS profiles.

NOTE: In case the Remote UE and Relay UE registered to different PLMNs, there need to be SLA established to govern the QoS handling, e.g. when the Relay Service Code (RSC) is configured. The SLA can include the mapping between the DSCP markings for the IPsec child SAs with the Remote UE and the corresponding QoS, and N3IWF IP address(es). The non-alteration of the DSCP field between N3IWF and the Relay UE's UPF is also assumed to be governed by an SLA and by transport-level arrangements that are outside of 3GPP scope. The packet detection filters at the Relay UE's UPF can be based on the N3IWF IP address and the DSCP markings.

The 5GC to which the UE-to-Network Relay registers and the 5GC to which the Remote UE registers may be the same or different. The solution does not mandate the Remote UE to be served by the same PLMN as the Relay UE.

6.23.2 Protocol Stacks

When access to N3IWF is used, the ProSe 5G UE-to-Network Relay shall be able to relay both control plane (NAS) and user plane unicast traffic (UL and DL) between the Remote UE and the network towards N3IWF. One-to-one Direct Communication is used between Remote UEs and ProSe 5G UE-to-Network Relays for unicast traffic as specified in solutions for Key Issue #2.

Remote UE and 5GC reuses the procedures defined in clause 4.12 of TS 23.502 [8] for supporting Registration and connection management from Remote UE to the 5GC over 5G ProSe UE-to-NW Relay access. Remote UE establishes signalling IPsec tunnel with the N3IWF over UE-to-NW relay access using the IKE procedures. Also, similar to untrusted non-3GPP Access, subsequent NAS messages between the UE and N3IWF are exchanged via the signalling IPsec SA over TCP/IP. The control plane protocol stack before establishing IPSec tunnel and after the setup of IPsec tunnel are same as the untrusted non-3GPP access protocol stacks and are shown in FIG. 6.23.2-2.

Figure 23:
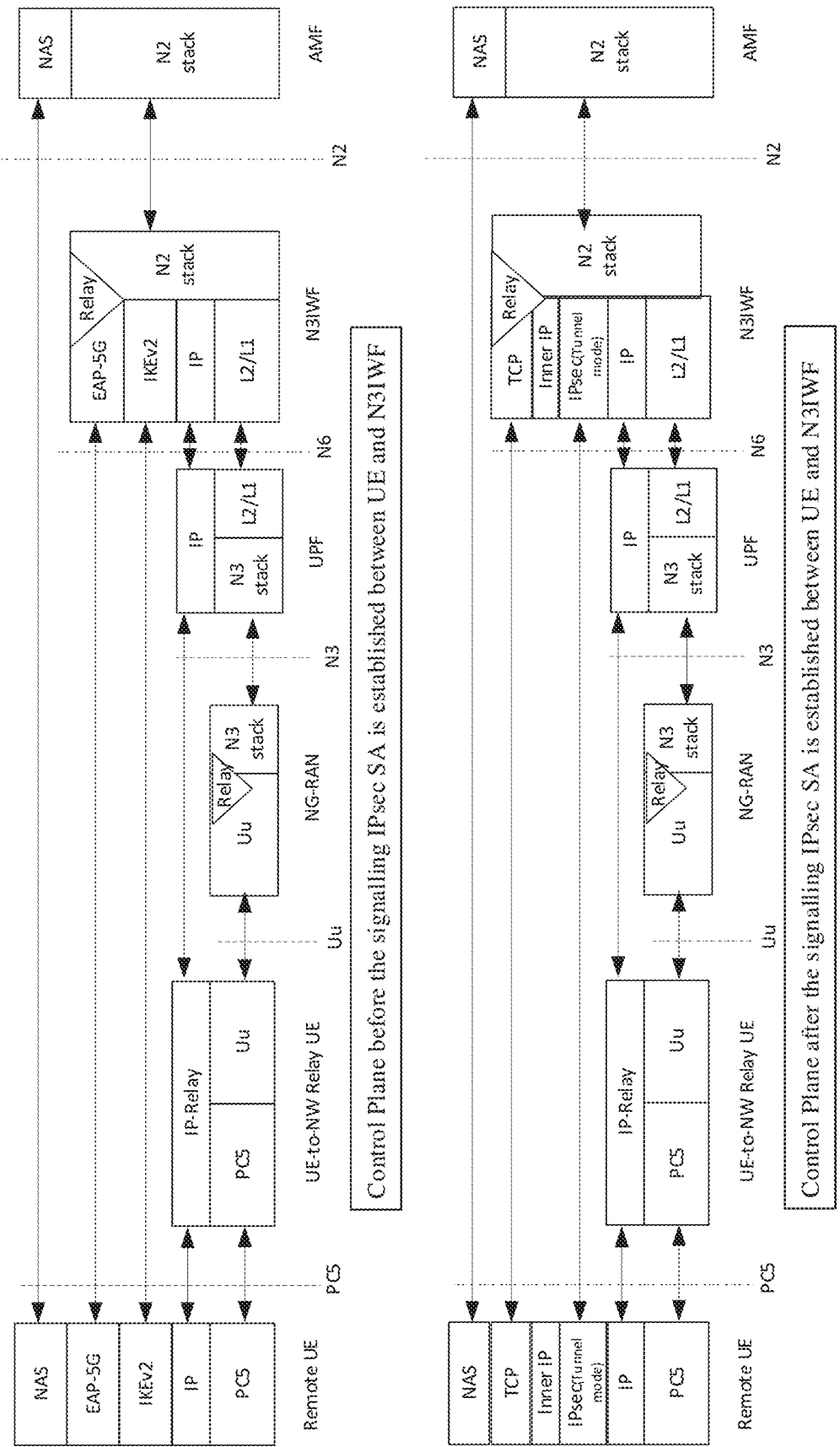
FIG. 23 is a reproduction of FIG. 6.23.2-2 of 3GPP TR 23.752 V0.5.0.

FIG. 6.23.2-2 of 3GPP TR 23.752 V0.5.0, Entitled "Control Plane Protocol Stacks Between Remote UE and N3IWF for L3 UE-to-NW Relay Access", is Reproduced as FIG. 23

Remote UE supports NAS MM (after registration), SMS and PDU Session establishment/modification/release procedures with the 5GC for the Remote UE traffic by transporting the corresponding NAS Signaling over the signaling IPsec tunnel established with N3IWF.

Remote UE transmits/receives the UP traffic over the Relay's PDU session(s) established for the Remote UE traffic over PC5 UE-to-NW Relay path via child IPSec SA tunnel to the N3IWF. The PCF may provide corresponding URSP rules to assist the Remote UE to identify the services that requires access to N3IWF. In the deployment, the Relay UE's UPF and N3IWF may be collocated.

The user plane protocol stack for L3 UE-to-NW Relay access via N3IWF is same as the user plane protocol stack for untrusted non-3GPP access and is shown in FIG. 6.23.2-3. The PDU Session type used between the Relay UE and Relay UE UPF is IP, however the traffic transported in the PDU Layer between the Remote UE and the UPF (PDU Session Anchor) can be IP, Ethernet or Unstructured.

Figure 24:
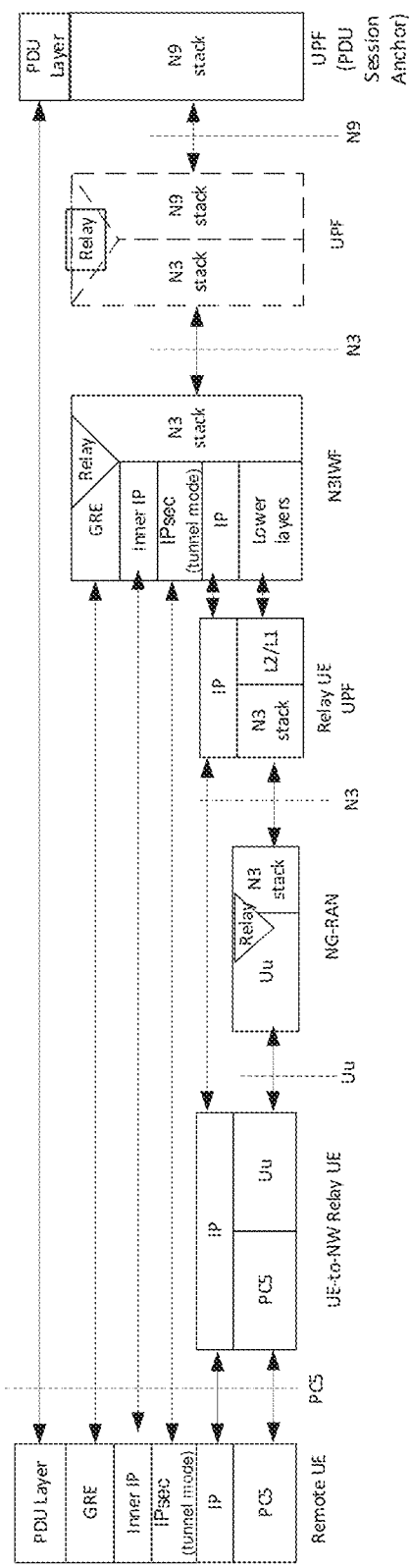
FIG. 24 is a reproduction of FIG. 6.23.2-3 of 3GPP TR 23.752 V0.5.0.

FIG. 6.23.2-3 of 3GPP TR 23.752 V0.5.0, Entitled "User Plane Protocol Stacks Between Remote UE and N3IWF for L3 UE-to-NW Relay Access", is Reproduced as FIG. 24

The solution is transparent for NG-RAN. The NG-RAN (gNB) does not have any different treatment for the Remote UE's traffic comparing to that in baseline Layer-3 UE-to-Network Relay solutions, e.g. described in clause 6.6.

Editor's note: Whether there is potential impact from this solution, in terms of the overhead introduced by N3IWF access and L3 IP relay over the radio interface (esp. over PC5), should be evaluated by RAN WGs (at least in terms of radio efficiency, latency and reliability).

Editor's note: It is FFS how mobility restrictions will be imposed and enforced on the Remote UE

6.23.3 Procedures

6.23.3.1 Remote UE 5GC Registration Over L3 UE-to-NW Relay Access

A 5G ProSe UE-to-Network Relay capable of access to N3IWF may register to the network (if not already registered) and establish a PDU session enabling the necessary relay traffic to the N3IWF. The 5G ProSe UE-to-NW Relay may need to connect to additional PDU session(s) or modify the existing PDU session in order to provide relay traffic towards Remote UE(s).

As an option, the ProSe UE-to-NW Relay may use two different PDU sessions, one for NAS traffic of Remote UE and other for UP traffic of the Remote UE via N3IWF, if different handling, e.g. priority, is needed.

Figure 25:
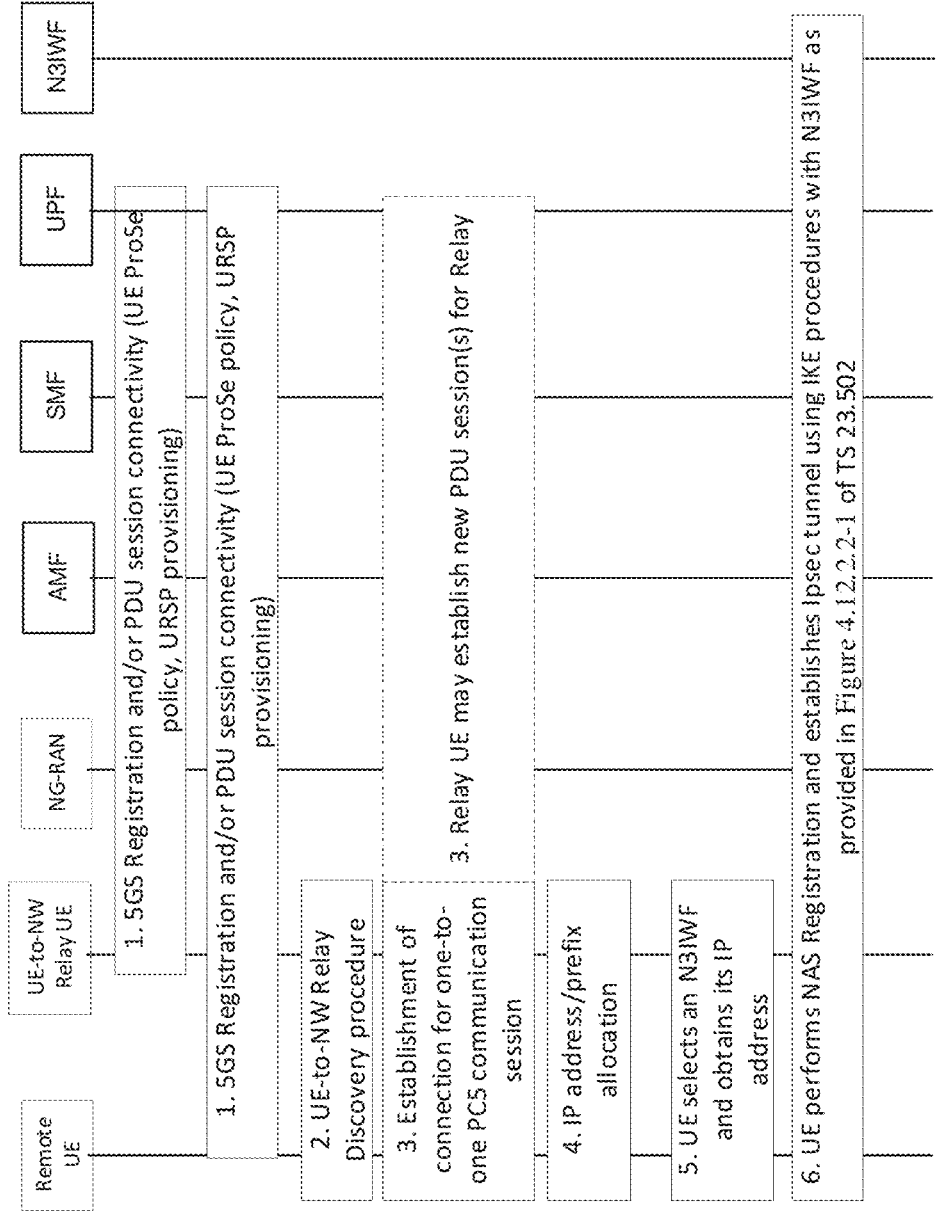
FIG. 25 is a reproduction of FIG. 6.23.3-1 of 3GPP TR 23.752 V0.5.0.

FIG. 6.23.3-1 of 3GPP TR 23.752 V0.5.0, Entitled "Remote UE 5GC Registration Over L3 UE-to-NW Relay Access", is Reproduced as FIG. 25

1. Remote UE and 5G ProSe UE-to-NW Relay when in-coverage may perform Registration procedures and obtain the ProSe policy and URSP policy information. The ProSe policy and URSP policy indicate whether Remote UE should access 5GC via N3IWF for a particular service or service flow (indicated by URSP). Authorization and provisioning procedure may be any solution for key issue #1 and #3.

Remote UE that has to operate out-of-the-box will be pre-configured with the ProSe policy and URSP policy information.

2-4. ProSe UE-to-NW Relay and Remote UE follow the procedures described in steps 1-4 in clause 6.6.2 Procedures, of solution #6: Layer-3 UE-to-Network Relay, with the below enhancements for N3IWF support:

the Remote UE and ProSe UE-to-Network Relay are configured (either via provisioning or pre-configuration) of the specific Relay Service Codes.

NOTE: The services requiring the access via N3IWF may be configured with the RSC(s) that can be served by the same Relay.

5. Remote UE selects an N3IWF and determines the N3IWF IP address.

Editor's note: Remote UE N3IWF selection procedures are FFS. It can follow the N3IWF selection procedures defined in clause 6.3.6.2 of TS 23.501 [6] for untrusted non-3GPP access as baseline but modifications may be required.

6. Remote UE establishes signaling IPsec tunnel using IKE procedures with N3IWF and performs NAS Registration as shown in FIG. 4.12.2.2-1 of TS 23.502 [8]. After the IPSec tunnel is established, Remote UE can perform any of the NAS procedures (incl. PDU Session establishment for the Relay PDU sessions) as specified in clause 4.12 of TS 23.502 [8].

IKE keep alive(s) between the Remote UE and the N3IWF are used for detecting possible path failure. The Remote UE may change Relay UE(s) while maintain the session with N3IWF when the Remote UE and N3IWF support MOBIKE. This is negotiated between the Remote UE and the N3IWF as specified in TS 23.502 [8], clause 4.12.2.2). When IKE keep alive(s) are used, the Remote UE needs to keep the PC5 connection and Relay UE keeps the PDU Session.

6.23.3.2 UE Moves Between Direct Network Communication and Indirect Communication Path When UE moves from direct network communication to indirect communication path, clause TS 23.502 [8] clause 4.9.2.2 applies after the remote UE establishes PC5 connection to the relay UE.

When UE moves from indirect communication path to direct network communication, the UE follows clause TS 23.502 [8] clause 4.9.2.1.

6.23.4 Impacts on Services, Entities and Interfaces

The solution has impacts in the following entities:

5GC entities (AMF, PCF, UPF):
  Need to support the non-3GPP access via N3IWF as defined in TS 23.501 [6] and TS 23.502 [8].

NG-RAN:
  Function on the solution adopted for QoS handling.

N3IWF:
  None.

Relay UE:
  Configured to establish a PDU session for relaying (network configuration ensures that this PDU Session provides access to N3IWF).

Remote UE:
  Remote UE needs to support running at least Rel-15 defined procedures for untrusted non-3GPP access via N3IWF over L3 UE-to-NW Relay.

6.24 Solution #24: End-to-End QoS Support for Layer-3 UE-to-Network Relay

6.24.1 General Description

This solution addresses Key Issue #3 "Support of UE-to-Network Relay". Specifically, this solution addresses the aspects on "How to support end-to-end requirements between Remote UE and the network via a UE-to-Network Relay, including QoS (such as data rate, reliability, latency)" and "How the network allows and controls the QoS requirement for 5G ProSe UE-to-NW relay."

In Layer 3 UE-to-NW relay solution (Solution #6), the Remote UE's data flow is served by the Relay UE's PDU Session. As the UE-to-Network relay path comprises of two legs (PC5 and Uu) as shown in FIG. 6.24.1-1 below, the end-to-end QoS can be met only when the QoS requirements are properly split and satisfied over the two legs respectively.

Figure 26:
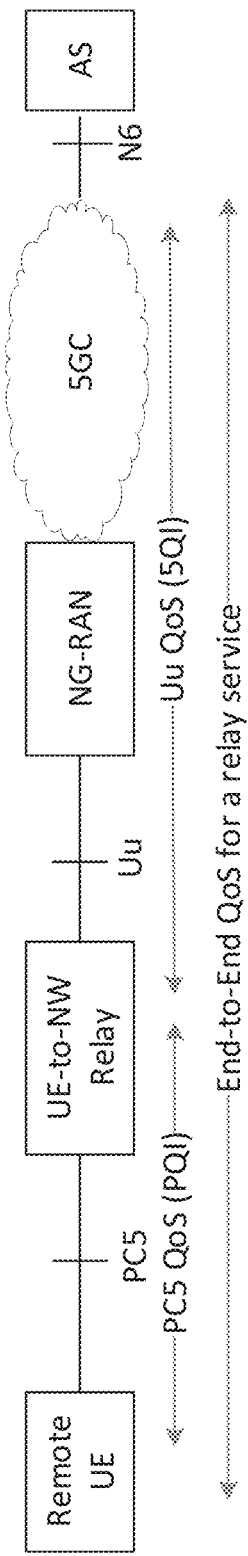
FIG. 26 is a reproduction of FIG. 6.24.1-1 of 3GPP TR 23.752 V0.5.0.

FIG. 6.24.1-1 of 3GPP TR 23.752 V0.5.0, Entitled "End-to-End QoS Split for Layer 3 UE-to-Network Relay Solution", is Reproduced as FIG. 26

The QoS requirements on the PC5 link are controlled with PC5 QoS rules and PC5 QoS parameters (PQI, GFBR, MFBR, PC5 LINK-AMBR, Range, etc) as specified in clause 5.4 of TS 23.287 [5]. The QoS requirements on the Uu link are controlled via with 5G QoS rules and 5G QoS parameters (5QI, GFBR, MFBR, etc) as specified in clause 5.7 of TS 23.501 [6].

The Uu leg's QoS is associated with the PDU Session established by the UE-to-Network Relay, and therefore the procedure as defined in TS 23.502 [8] clause 4.3.2 and 4.3.3 applies. The SMF of the UE-to-Network Relay would provide the corresponding QoS rules and flow level QoS parameters to the UE-to-Network Relay.

As explained above, the UE-to-Network Relay needs to translate the Uu QoS information into the corresponding PC5 QoS parameters in order to achieve the proper end-to-end QoS. Since the Remote UE and the UE-to-Network Relay uses PC5 unicast communication mode, most of the flow level QoS parameters can be directly reused. The only parameter that requires assistance in the translation is the mapping of 5QIs and PQIs. It is therefore necessary that the UE-to-Network Relay to be configured with the proper mapping information. The mapping of 5QIs and PQIs are configured at UE-to-Network Relay for a specific service or for a group of services. The 5QI for Uu and PQI for PC5 are used together to support the end-to-end QoS requirement.

NOTE 1: The service or the group of services can be identified by Relay Service Code, IP 3-tuple(s) etc.

In case the QoS Flows setup are initiated by network, PCF or SMF decides the Uu part QoS parameters. Based on this information received form SMF, the UE-to-Network Relay deduces the PC5 part QoS parameters and establishes corresponding PC5 QoS Flows, using the procedure defined in TS 23.287 [5] clause 6.3.3.4. For example, after receiving the QoS rules and flow level parameters, the Relay UE determines the corresponding PC5 QoS Flows to establish and the mapping between the Uu QoS Flows and the PC5 QoS Flows.

In case that the Remote UE requested dedicated PC5 QoS Flows when establishing the L2 Link over PC5, Remote UE decides the PC5 part QoS parameters, the UE-to-Network can map the PC5 QoS requirements into Uu QoS requirements and perform the UE requested PDU session Modification as defined in TS 23.502 [8] clause 4.3.3.

6.24.2 Enhancements to Support Dynamic QoS Handling

As shown in FIG. 6.24.1-1, the end-to-end connection from the Remote UE to the AS involves two over-the-air links, i.e. Uu and PC5. Therefore, to meet the PDB for a particular service, the AN PDB utilized by the NG-RAN needs to be reduced, in order to give some budgets for the PC5 link. Note that this is independent of whether L2 or L3 Relay architecture is used.

One way to achieve this without affecting the NG-RAN is for the SMF to modify the PDB signalled to the NG-RAN in the QoS Profile for the QoS Flows of the Remote UE's traffic. SMF follows the PCC rules (if it is PCF determined) or based on local configuration to deduct the PDB.

When dynamic PCC control is supported, the SMF can base on the PCC rules to determine the PDB to use. Otherwise, SMF can base on pre-configuration, e.g. using DNN and/or S-NSSAI, to determine if and how to modify the PDB.

When dynamic PCC control is supported, it is possible that the AF may be able to request certain QoS handling of the traffic when the Remote UE initiated a session. This can be achieved by using the feature as defined in TS 23.503 [18] clause 6.1.3.22. The AF is able to locate the UE-to-Network Relay's PCF using the procedure as defined in TS 23.503 [18] clause 6.1.1.2, since the Remote UE uses an address belonging to the UE-to-Network Relay's PDU session. The PCF can decide the Uu part QoS parameters and generate corresponding PCC rules, and the SMF in turn generate the QoS rules and flow level QoS parameters and signal to the UE-to-Network Relay using PDU Session Modification procedure. The UE-to-Network Relay then deduces the PC5 part QoS parameters based on the configured mapping of 5QIs and PQIs and uses the L2 Link Modification procedure defined in TS 23.287 [5] clause 6.3.3.4 to set up the related PC5 QoS flows.

NOTE: As UE-to-Network Relay uses the configured mapping of 5QIs and PQIs to deduce the PC5 part QoS parameters, the end-to-end QoS requirements provided by AF which can't align with the configured mapping of 5QIs and PQIs is not supported in this solution.

In case of network scheduled operation mode for NR PC5 is used, procedures defined in TS 23.287 [5] clause 5.4.1.4 is used to authorize the PC5 QoS requests related to the relay operation.

Editor's note: How to determine QoS parameters for PDU Session is FFS, such as which UE's subscription is used.

Alternatively, reflective QoS control over Uu as defined in TS23.502 [8] clause 5.7.3.5 can be leveraged for dynamic QoS handling of remote UE. In particular, it does not require any explicit intervention from SMF. This can potentially save on signalling between SMF and UE-to-Network Relay UE to frequently modify the relaying PDU session over Uu. Upon reception of a DL packet with RQI on the Uu for the remote UE, based on the QFI indicated, the UE-to-Network Relay may optionally derive a QoS rule, corresponding to the remote UE. The derived rule is for UL packets from the remote UE for which the new QFI (based on RQoS) is to be used.

To do so, the UE-to-Network Relay may determine the PQI based on the indicated 5QI on the DL Uu (due to Reflective QoS). The UE-to-Network Relay may locally associate the remote UE (i.e. the PC5 QoS flow with the remote UE) to the derived QoS rule.

The UE-to-Network Relay may then modify either the associated PC5 QoS flow or mapping between Uu and PC5 QoS flows towards the remote UE in order to match the PQI of the PC5 flow to the indicated 5QI over the DL Uu. The UE-to-Network Relay then uses e.g. the L2 Link Modification procedures as defined in TS 23.287 [5] clause 6.3.3.4 to modify the related PC5 QoS flows.

When the UE-to-Network relay deletes the derived QoS rule e.g. after the RQ Timer expires, the UE-to-Network Relay resumes back to use the signalled QoS rule and performs L2 Link Modification procedures defined in TS 23.287 [5] clause 6.3.3.4 accordingly to use the PQI that corresponds to the 5QI of the existing signalled QoS rule.

Editor's note: It is FFS how to activate the reflective QoS control for UE-to-Network Relay.

Editor's note: Whether the UE-to-Network Relay needs to modify the mapping between Uu and PC5 QoS flows based on the DL packet with RQI is FFS.

6.24.2 Procedures

Existing procedures defined in TS 23.502 [8] and TS 23.287 [5] can be used to manage the QoS flows and PC5 QoS flows to serve the Remote UE.

6.24.3 Impacts on Services, Entities and Interfaces

The solution has impacts in the following entities:

SMF:
SMF optionally supports modifying the PDB for a QoS Flow serving the Remote UE based on either PCC rules or pre-configuration.

UE:
5G ProSe UE-to-Network Relay supports the mapping of Uu flow level QoS parameters to PC5 QoS parameters, including the mapping of 5QIs to PQIs, based on configuration.

5G ProSe UE-to-Network Relay modifies the PQI of the PC5 link to match the QFI of the derived QoS rule.

Remote UE supports to decide the PC5 part QoS parameters based on the E2E QoS parameters.

PCF:
supports to decide the Uu part QoS parameters based on the E2E QoS parameters.

6.25 Solution #25: QoS Handling for Layer-3 UE-to-Network Relay 6.25.1 Description This is a solution for Key Issue #3, UE-to-Network Relay. especially it's used for the QoS control of Layer-3 UE-to-Network Relay.

For a Remote UE accessing network via UE-to-Network Relay, the QoS control between Remote UE and UPF includes two parts: one part is the QoS control for the connection between remote UE and UE-to-Network Relay, the other part is the QoS control for the connection between UE-to-Network Relay and UPF. In this solution PCF is responsible to set the QoS parameters between UE and UE-to-Network Relay, (we call it "PC5 QoS parameters"), and the QoS parameters between UE-to-Network Relay and UPF (we call it "Uu QoS parameters") separately to support the QoS requirement between Remote UE and UPF.

For PC5 interface, when standardized PQI is used, the PC5 QoS parameters includes PQI and other optional QoS parameters, e.g. GFBR. When non-standardized PQI is used, the whole set of PC5 QoS characteristics is also included. PCF ensures the PDB associated with the 5QI in the Uu QoS parameters and the PDB associated with the PQI in the PC5 QoS parameters supports the PDB between Remote UE and UPF. PCF also ensures other QoS parameters/QoS characteristics in the Uu QoS parameters and PC5 QoS parameters are compatible, e.g. have the same value.

The UE-to-Network Relay and Remote UE are pre-configured with authorized service(s) and the related PC5 QoS parameters. These can be provided by PCF during provisioning procedure. PCF may also provide default PC5 QoS parameters to NW Relay and Remote UE, this can be used for the out of coverage Remote UE or for the applications which is not frequently used.

When a Remote UE want to use the service offered by an AF through 3GPP network, it selects a UE-to-Network Relay and establishes a PC5 connection between Remote UE and NW Relay, if the Remote UE doesn't have the PC5 QoS parameters of the service, a default PC5 QoS Flow is setup using the default PC5 QoS parameters in the provisioning information.

UE-to-Network Relay also setup a corresponding PDU session for relaying, e.g. based on the S-NSSAI, DNN requested by remote UE. After the IP address/prefix allocation, UE-to-Network Relay reports the IP info of remote UE to SMF, PCF also receives the IP info of remote UE from SMF.

If the Remote UE doesn't have the PC5 QoS parameters of the service, After the PC5 connection and the related PDU session setup, remote UE interacts with AF for the application layer controlling messages required by the service, the interaction is transferred through the default PC5 QoS Flow and the default QoS Flow of the PDU session. Then AF provides the service requirement to PCF. As PCF has received the remote UE report from SMF, PCF knows the target UE requested by AF is a remote UE, PCF generates PCC rules (for QoS control on Uu) and the PC5 QoS parameters (for QoS control on PC5), the PCF decision for example could base on the received service requirements from AF and the operator policies and the charging rate of Uu and PC5.

Alternatively, the Remote UE can send the E2E QoS requirement to PCF via relay UE over the PC5 message and NAS message without AF involved, and then the PCF performs the E2E QoS split and generates PCC rules and PC5 QoS parameters based on the remote UE provided E2E QoS requirement.

6.25.2 Procedures with AF Involved

Figure 27:
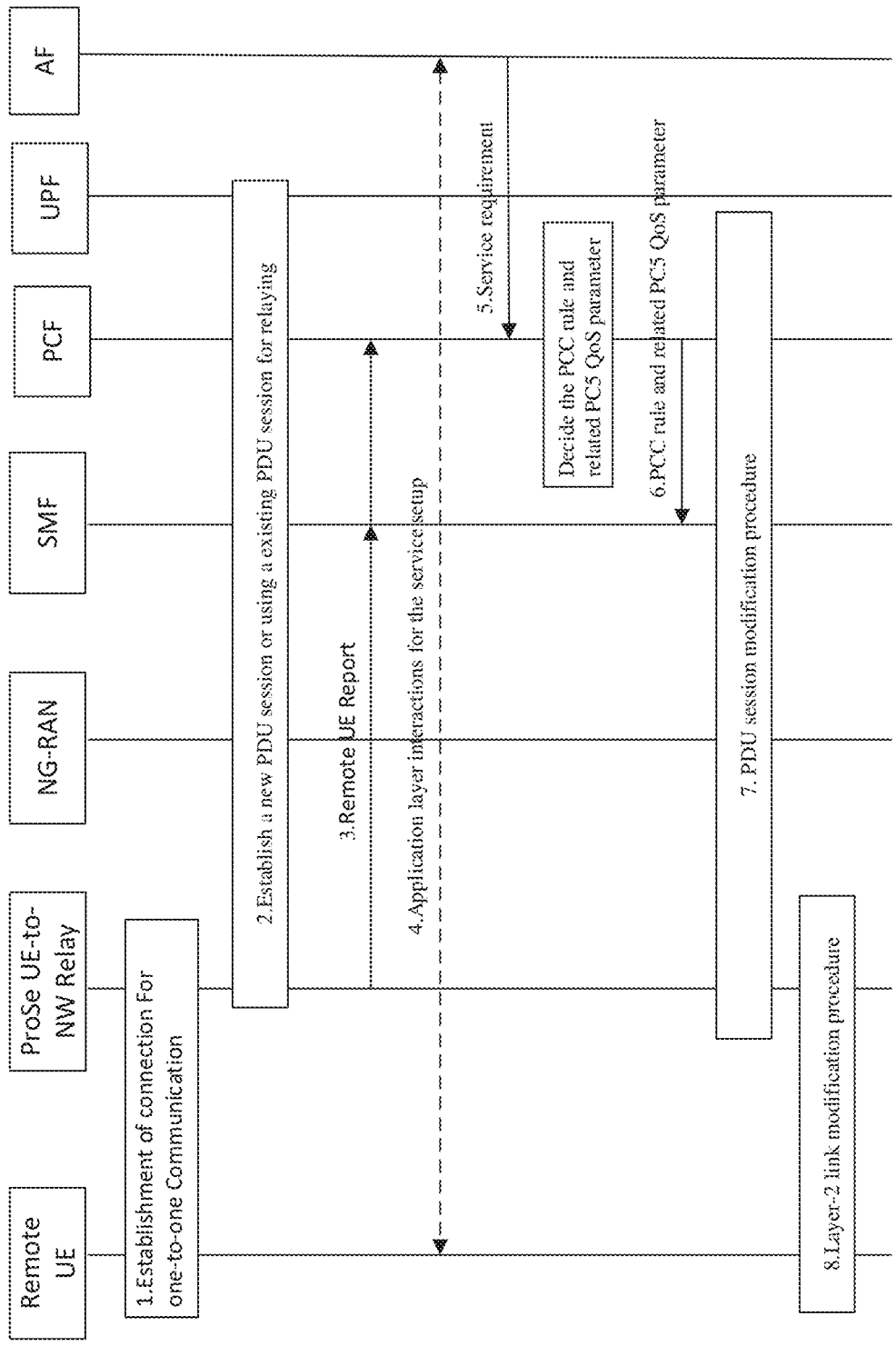
FIG. 27 is a reproduction of FIG. 6.25.2-1 of 3GPP TR 23.752 V0.5.0.

FIG. 6.25.2-1 of 3GPP TR 23.752 V0.5.0, Entitled "QoS Control for L3 UE-to-Network Relay with AF Involved", is Reproduced as FIG. 27

Figure 28:
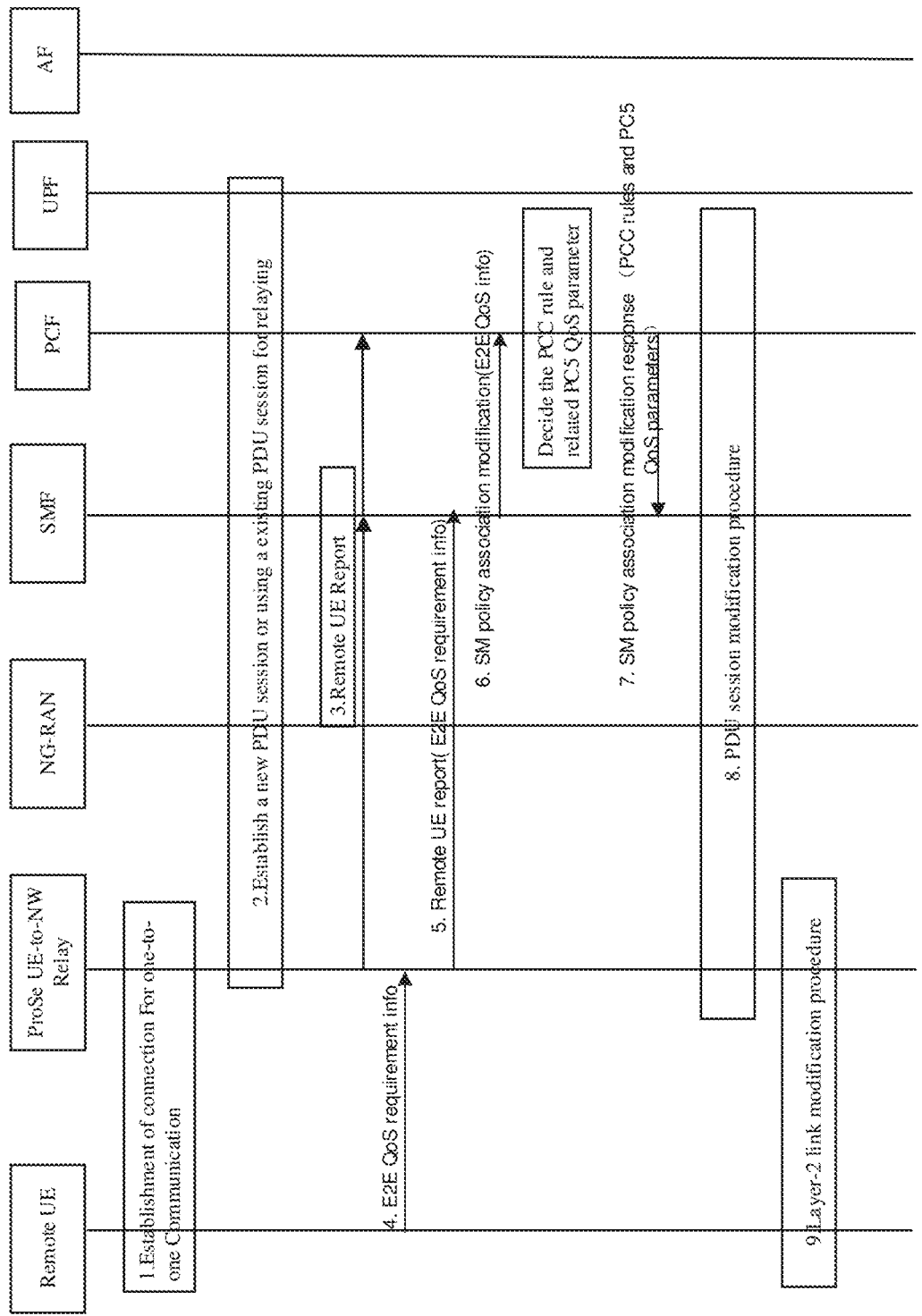
FIG. 28 is a reproduction of FIG. 6.25.3-1 of 3GPP TR 23.752 V0.5.0.

1. When a Remote UE want to use the service offered by an AF through 3GPP network, it selects a UE-to- Network Relay and establishes a PC5 connection between Remote UE and NW Relay, it's same as the PC5 part of step3 described in clause 6.6.2. In this step, if the Remote UE doesn't have the PC5 QoS parameters of the service, a default PC5 QoS Flow is setup using the default PC5 QoS parameters in the provisioning information.
2. UE-to-Network Relay sets up a corresponding PDU session or uses an existing PDU session for relaying, e.g. based on the S-NSSAI, DNN requested by remote UE.
3. After the IP address/prefix allocation, UE-to-Network Relay reports the IP info of remote UE to SMF, SMF also forwards the received report to PCF.
4. If the Remote UE doesn't have the PC5 QoS parameters of the service, Remote UE interacts with AF for the application layer controlling messages required by the service, the interaction is transferred through the default PC5 QoS Flow and the default QoS Flow of the PDU session.
5. Since the address used by Remote UE belongs to the UE-to-Network Relay's PDU session, AF is able to locate the UE-to-Network Relay's PCF and provides the service requirement to PCF.
6. PCF knows the target UE requested by AF is a remote UE, e.g. by the IP info provided by AF and the IP info of remote UE received from SMF. PCF generates PCC rules (for QoS control on Uu) and the PC5 QoS parameters (for QoS control on PC5), the PCF decision for example could base on the received service requirements from AF and the operator policies and the charging rate of Uu and PC5. PCF provides PCC decision to SMF.
7. Based on the PCC rules received from PCF, SMF may decides to setup a new QoS Flow or modify an existing QoS Flow for the PDU session. SMF generates QoS rule to be enforced at UE-to-Network Relay and the QoS profile to be enforced at RAN for the QoS control of Uu part. PDU session modification procedure is performed. The PC5 QoS parameters is also provided to UE-to-Network Relay together with the related QoS rule.
8. UE-to-Network Relay uses the PC5 QoS parameters received from CN to initiate the Layer-2 link modification procedure as described in TS 23.287 [5].
NOTE: In case of network scheduled operation mode for NR PC5 is used, procedures defined in TS 23.287 [5] clause 5.4.1.4 is used to authorize the PC5 QoS requests related to the relay operation.
Editor's note: How to determine PC5 QoS parameters and QoS parameters for PDU Session is FFS, such as which UE's subscription is used.
6.25.3 Procedures without AF Involved FIG. 6.25.3-1 of 3GPP TR 23.752 V0.5.0, Entitled "QoS Control for L3 UE-to-Network Relay without AF Involved", is Reproduced as FIG. 28

1~3. Step1~3 are same to the step1~3 of clause 6.25.2.
4. Remote UE sends the E2E QoS requirement info to UE-to-Network relay. The E2E QoS requirement info may be the application requirement (e.g. priority requirement, reliability requirement, delay requirement) or E2E QoS parameters. The E2E QoS parameters may be derived from the application requirement or based on the mapping of the ProSe service type to E2E QoS parameters.
NOTE: It is expected that the Authorization and Provisioning for ProSe communication contains the mapping of the ProSe service type to E2E QoS parameters similar to V2X communication.
5. UE-to-Network relay forwards the E2E QoS requirement info to the SMF via the Remote UE report with the Remote UE info.
6. SMF also forwards the E2E QoS requirement info to the SMF by the SM policy association modification procedure.
7. The PCF decides the PCC rules and PC5 QoS parameters based on E2E QoS requirement info, operator policies and the charging rate of Uu and PC5. PCF provides the PCC rules and PC5 QoS parameters to the SMF.
8~9. The handling of step 8~9 is same as the step 7~8 of clause 6.25.2.
6.25.4 Impacts on Services, Entities and Interfaces
PCF:
  PCF generates PCC rules (for QoS control on Uu) and the PC5 QoS parameters (for QoS control on PC5).
SMF:
  Provides the PC5 QoS parameters to UE-to-Network Relay during PDU session modification procedure.
UE-to-Network Relay:
  UE-to-Network Relay modify the Layer-2 link based on the PC5 QoS parameters received from CN.
  Forwards the E2E QoS requirement received from remote UE to CN.
Remote UE:
  Sends the E2E QoS requirement to UE-to-Network Relay.
  According to 3GPP TR 23.752, UE-to-Network Relay communication is studied for UE to access network via indirect network communication. Basically, Rel-16 5G architectural design (e.g. flow-based QoS communication over PC5/Uu interface) could be taken into consideration. In the scenario of UE-to-Network relay communication, a remote UE would access the network (e.g. 5GC) via a relay UE where the remote UE would be in out-of-coverage while the relay UE would be in-coverage. The remote UE would communicate with the relay UE via PC5 interface (or called sidelink interface) for accessing the network, while the relay UE would communicate with a base station (e.g. gNB) via Uu interface for forwarding traffic between the remote UE and the network.
  Possibly, a remote UE may reuse the procedures (e.g. PC5 unicast link establishment procedure, PC5 unicast link authentication procedure, PC5 unicast link security mode control procedure and/or etc.) introduced in 3GPP TS 23.287 and TS 24.587 to establish a direct link with a relay UE. In a PC5 unicast link establishment procedure, a first UE could send a first PC5-S message (e.g. DIRECT LINK ESTABLISHMENT REQUEST or Direct Communication Request) to a second UE for requesting establishment of a unicast link with the second UE. In response to reception of the first PC5-S message, the second UE may send a second PC5-S message (e.g. DIRECT LINK SECURITY MODE COMMAND or Security Mode Command) to the first UE for establishing security context (including e.g. a PEK, a PIK and/or a security algorithm) between the both UEs.
  After receiving the second PC5-S message, the first UE could send a third PC5-S message (e.g. DIRECT LINK SECURITY MODE COMPLETE or Security Mode Complete) to the second UE for completing the security context establishment. And then, the second UE could send a fourth PC5-S message (e.g. DIRECT LINK ESTABLISHMENT ACCEPT or Direct Communication Accept) to the first UE for completing the unicast link establishment. For security, PC5 QoS information of the unicast link should be protected. The PC5 Quality of Service (QoS) information may indicate one or more PC5 QoS flows of the unicast link. Each PC5 QoS flow may be associated with one PC5 Flow ID (PFI) and one corresponding PC5 QoS parameters (i.e. PC5 5QI (PQI) and conditionally other parameters such as Maximum Flow Bit Rate (MFBR)/Guaranteed Flow Bit Rate (GFBR), etc.). Thus, a PC5 QoS information (requested by the first UE) could be included in the third PC5-S message since the third PC5-S message is sent with protection (using e.g. the PEK, the PIK and/or the security algorithm). Also, a PC5 QoS information (accepted by the second UE) could be included in the fourth PC5-S message since the fourth PC5-S message is sent with protection. For a Remote UE performing UE-to-Network Relay communication with a Relay UE, the Remote UE could reuse such PC5-unicast link establishment procedure to establish a direct link with the Relay UE. In other words, the Remote UE could correspond to the first UE while the Relay UE could correspond to the second UE, or vice versa.

According to 3GPP TR 23.752, for a Remote UE accessing network via a Relay UE, the QoS control between the Remote UE and User Plane Function (UPF) includes two parts: one part is the QoS control for the connection between the remote UE and the Relay UE, and the other part is the QoS control for the connection between the Relay UE and UPF. Possibly, Policy Control Function (PCF) is responsible to set the QoS parameters between the Remote UE and the Relay UE, (so called "PC5 QoS parameters"), and the QoS parameters between the Relay UE and UPF (so called "Uu QoS parameters") separately to support the (end-to-end) QoS requirement between the Remote UE and UPF.

If the Remote UE does not have the PC5 QoS parameters of a service (using UE-to-Network Relay communication), Remote UE could interact with Application Function (AF) for the application layer controlling messages required by the service. Then, PCF could know the target UE requested by AF is Remote UE and generate Policy and Charging Control (PCC) rules (for QoS control on Uu) and the PC5 QoS parameters (for QoS control on PC5). The PCF decision could be based on the received service requirements from AF. PCF could provide PCC decision to SMF. Based on the PCC rules received from PCF, Session Management Function (SMF) may decide to setup a new QoS Flow or modify an existing QoS Flow for a Protocol Data Unit (PDU) session for the service. SMF could generate QoS rule to be enforced at the Relay UE and the QoS profile to be enforced at RAN (Radio Access Network, e.g. a base station or gNB) for the QoS control of Uu part. Thus, SMF could perform a PDU session modification procedure for the QoS control on Uu and/or provide the PC5 QoS parameters together with the related QoS rule to the Relay UE.

And then, the Relay UE could perform e.g. a Layer-2 link modification procedure with the Remote UE for the PC5 QoS parameters. In other words, it is not necessary to negotiate PC5 QoS information in the procedure of the direct link establishment since the network anyway will determine the PC5 QoS parameters for UE-to-Network Relay communication and then both Relay UE and Remote UE will apply the PC5 QoS parameters determined by the network after complete of the procedure of the direct link establishment. Therefore, the PC5 QoS information negotiated in the procedure of the direct link establishment would cause signaling overhead.

To address the issue, the remote UE (and/or the relay UE) may not need to negotiate PC5 QoS information within the procedure of establishing a direct link between the relay UE and the remote UE. More specifically, a presence of PC5 QoS information could be optional in any PC5-S message exchanged between the remote UE and the relay UE within a procedure of establishing a direct link between the remote UE and the relay UE. This concept could be applied in a PC5-S message used for completing a security context establishment within the procedure of establishing the direct link. In this example, this PC5-S message could be e.g. a DIRECT LINK SECURITY MODE COMPLETE or Security Mode Complete message. This concept could be (also) applied in a PC5-S message used for completing the procedure of establishing the direct link. In this example, this PC5-S message could be e.g. a DIRECT LINK ESTABLISHMENT ACCEPT or Direct Communication Accept message.

In above examples, if this PC5-S message is sent within a procedure of establishing a direct link between a remote UE and a relay UE, PC5 QoS information could be absent in this PC5-S message. If this PC5-S message is sent within a procedure of establishing a unicast link between two UEs (i.e. not for UE-to-Network Relay communication), PC5 QoS information could be present in this PC5-S message.

In case of UE-to-UE relay communication (i.e. UE1 and UE2 communicates each other via a Relay UE), the above concept would not be applied since no network instance will be responsible to determine PC5 QoS parameters for a PDU session established between UE1 and UE2. Instead, PC5 QoS parameters used for a first direct link between UE1 and the relay UE could be negotiated between UE1 and the relay UE within a procedure of establishing the first direct link. Similarly, PC5 QoS parameters used for a second direct link between the relay UE and UE2 could be negotiated between the relay UE and UE2 within a procedure of establishing the second direct link.

Figure 29:
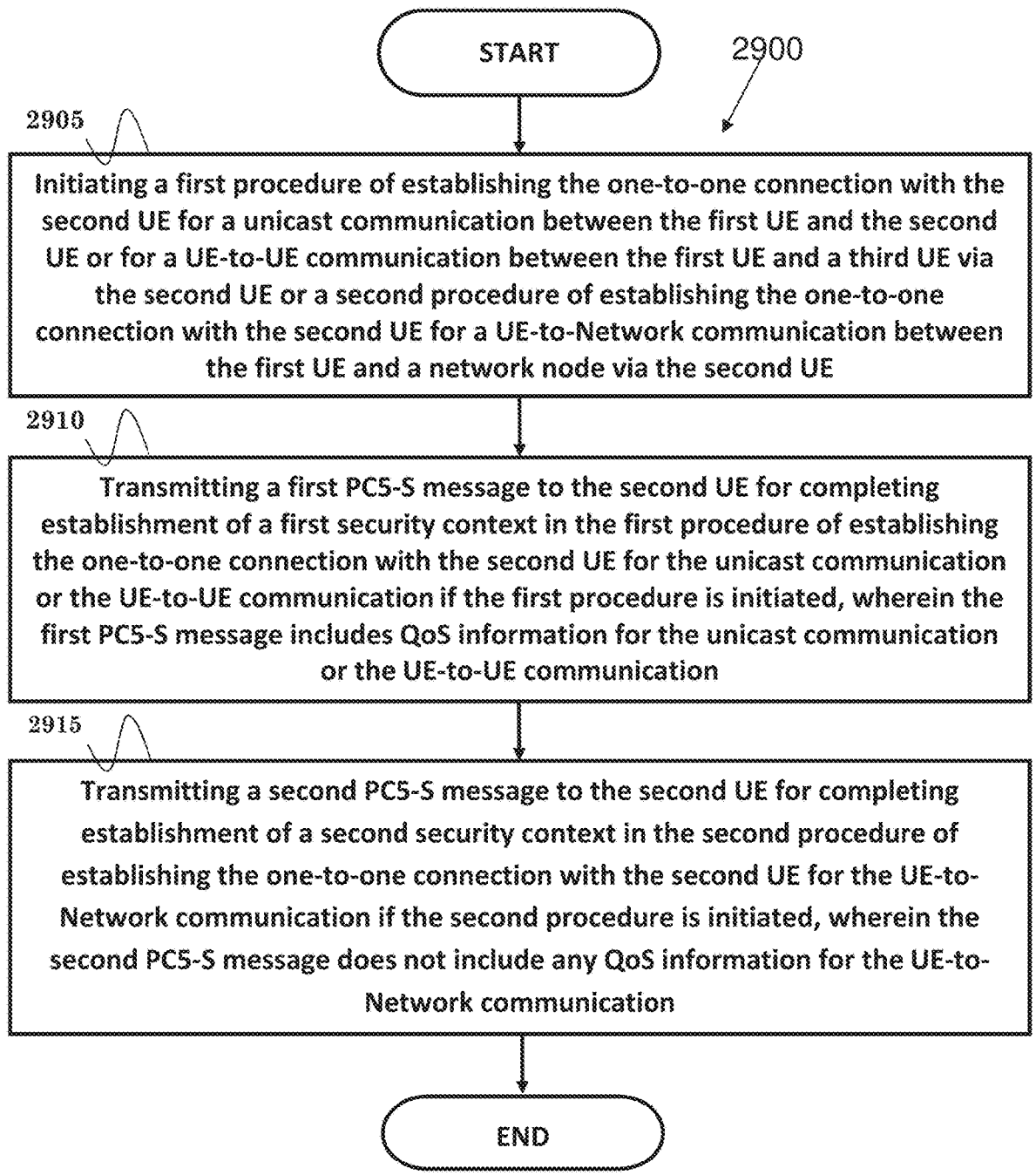
FIG. 29 is a flow chart according to one exemplary embodiment.

FIG. 29 is a flow chart 2900 according to one exemplary embodiment from the perspective of a first UE to establish one-to-one connection between the first UE and a second UE. In step 2905, the first UE initiates a first procedure of establishing the one-to-one connection with the second UE for a unicast communication between the first UE and the second UE or for a UE-to-UE communication between the first UE and a third UE via the second UE or a second procedure of establishing the one-to-one connection with the second UE for a UE-to-Network communication between the first UE and a network node via the second UE. In step 2910, the first UE transmits a first PC5-S message to the second UE for completing establishment of a first security context in the first procedure of establishing the one-to-one connection with the second UE for the unicast communication or the UE-to-UE communication if the first procedure is initiated, wherein the first PC5-S message includes QoS information for the unicast communication or the UE-to-UE communication. In step 2915, the first UE transmits a second PC5-S message to the second UE for completing establishment of a second security context in the second procedure of establishing the one-to-one connection with the second UE for the UE-to-Network communication if the second procedure is initiated, wherein the second PC5-S message does not include any QoS information for the UE-to-Network communication.

In one embodiment, the first UE could transmit a third PC5-S message to the second UE for initiating the first procedure of establishing the one-to-one connection or the second procedure of establishing the one-to-one connection. The first UE could receive a fourth PC5-S message from the second UE for completing the first procedure of establishing the one-to-one connection or the second procedure of establishing the one-to-one connection. The third PC5-S message could be a Direct Communication Request message or a Direct Link Establishment Request message, and the fourth PC5-S message could be a Direct Communication Accept message or a Direct Link Establishment Accept message.

In one embodiment, the first UE could receive a fifth PC5-S message from the second UE for establishing the first security context for the one-to-one connection in the first procedure of establishing the one-to-one connection or for establishing the second security context for the one-to-one connection in the second procedure of establishing the one-to-one connection. The fifth PC5-S message could be a Security Mode Command message or a Direct Link Security Mode Command message, and wherein the first or second PC5-S message could be a Security Mode Complete message or a Direct Link Security Mode Complete message.

In one embodiment, a presence of the QoS information in the first or second PC5-S message could be defined as optional. Alternatively, a presence of the QoS information in the first PC5-S message could be defined as mandatory. Furthermore, the QoS information may not be defined in the second PC5-S message.

Referring back to FIGS. 3 and 4, in one exemplary embodiment of a first UE to establish one-to-one connection between the first UE and a second UE, the first UE 300 includes a program code 312 stored in the memory 310. The CPU 308 could execute program code 312 (i) to initiate a first procedure of establishing the one-to-one connection with the second UE for a unicast communication between the first UE and the second UE or for a UE-to-UE communication between the first UE and a third UE via the second UE or a second procedure of establishing the one-to-one connection with the second UE for a UE-to-Network communication between the first UE and a network node via the second UE, (ii) to transmit a first PC5-S message to the second UE for completing establishment of a first security context in the first procedure of establishing the one-to-one connection with the second UE for the unicast communication or the UE-to-UE communication if the first procedure is initiated, wherein the first PC5-S message includes QoS information for the unicast communication or the UE-to-UE communication, and (iii) to transmit a second PC5-S message to the second UE for completing establishment of a second security context in the second procedure of establishing the one-to-one connection with the second UE for the UE-to-Network communication if the second procedure is initiated, wherein the second PC5-S message does not include any QoS information for the UE-to-Network communication. Furthermore, the CPU 308 can execute the program code 312 to perform all of the above-described actions and steps or others described herein.

Figure 30:
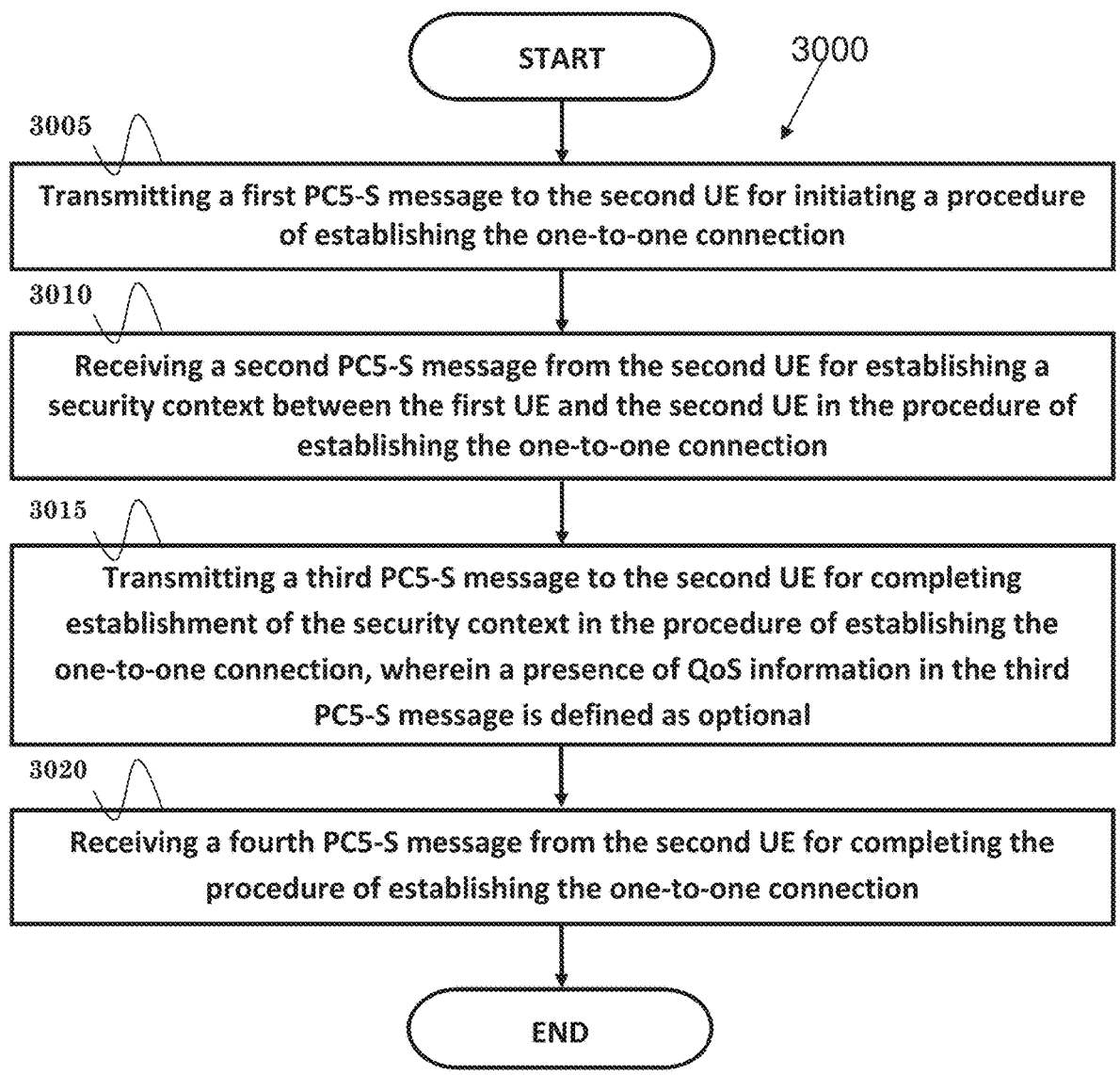
FIG. 30 is a flow chart according to one exemplary embodiment.

FIG. 30 is a flow chart 3000 according to one exemplary embodiment from the perspective of a first UE to perform a procedure for establishing a one-to-one connection between the first UE and a second UE. In step 3005, the first UE transmits a first PC5-S message to the second UE for initiating a procedure of establishing the one-to-one connection. In step 3010, the first UE receives a second PC5-S message from the second UE for establishing a security context between the first UE and the second UE in the procedure of establishing the one-to-one connection. In step 3015, the first UE transmits a third PC5-S message to the second UE for completing establishment of the security context in the procedure of establishing the one-to-one connection, wherein a presence of QoS information in the third PC5-S message is defined as optional. In step 3020, the first UE receives a fourth PC5-S message from the second UE for completing the procedure of establishing the one-to-one connection.

In one embodiment, the third PC5-S message may include a QoS information if the one-to-one connection is used for a unicast communication between the first UE and the second UE or a UE-to-UE communication between the first UE and a third UE via the second UE, and the third PC5-S message may not include any QoS information if the one-to-one connection is used for a UE-to-Network communication between the first UE and a network node via the second UE.

In one embodiment, the first PC5-S message may be a Direct Communication Request message or a Direct Link Establishment Request message, and the fourth PC5-S message may be a Direct Communication Accept message or a Direct Link Establishment Accept message. The second PC5-S message may be a Security Mode Command message or a Direct Link Security Mode Command message, and the third PC5-S message may be a Security Mode Complete message or a Direct Link Security Mode Complete message.

Referring back to FIGS. 3 and 4, in one exemplary embodiment of a first UE to perform a procedure for establishing a one-to-one connection between the first UE and a second UE, the first UE 300 includes a program code 312 stored in the memory 310. The CPU 308 could execute program code 312 to enable the first UE (i) to transmit a first PC5-S message to the second UE for initiating a procedure of establishing the one-to-one connection, (ii) to receive a second PC5-S message from the second UE for establishing a security context between the first UE and the second UE in the procedure of establishing the one-to-one connection, (iii) to transmit a third PC5-S message to the second UE for completing establishment of the security context in the procedure of establishing the one-to-one connection, wherein a presence of QoS information in the third PC5-S message is defined as optional, and (iv) to receive a fourth PC5-S message from the second UE for completing the procedure of establishing the one-to-one connection. Furthermore, the CPU 308 can execute the program code 312 to perform all of the above-described actions and steps or others described herein.

Figure 31:
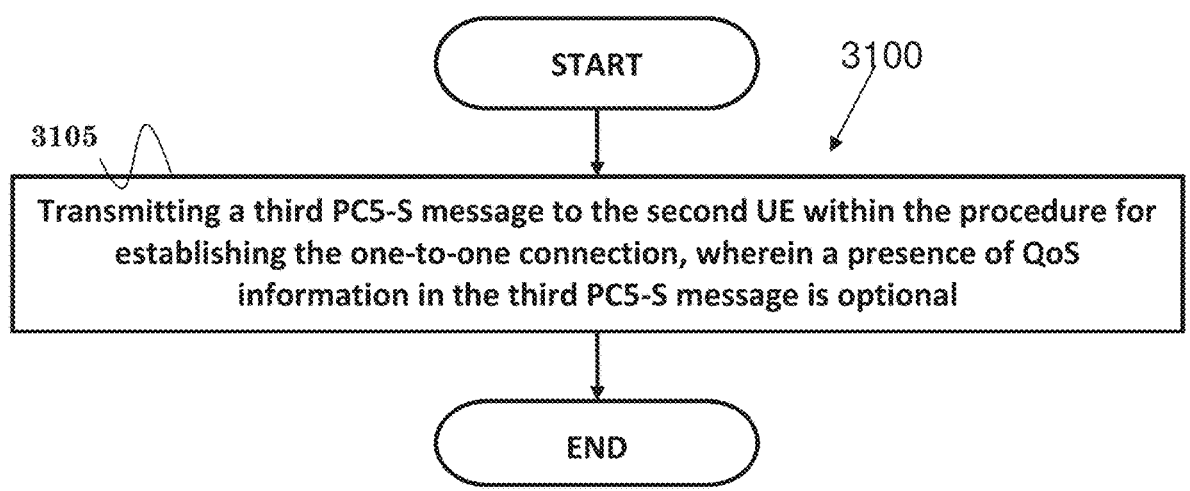
FIG. 31 is a flow chart according to one exemplary embodiment.

FIG. 31 is a flow chart 3100 according to one exemplary embodiment from the perspective of a first UE to perform a procedure for establishing a one-to-one connection between the first UE and a second UE. In step 3105, the first UE transmits a third PC5-S message to the second UE within the procedure for establishing the one-to-one connection, wherein a presence of QoS information in the third PC5-S message is optional.

In one embodiment, the first UE could transmit a first PC5-S message to second UE for initiating the procedure for establishing the one-to-one connection. The first UE could also receive a second PC5-S message from the second UE for establishing security context between the first UE and the second UE within the procedure for establishing the one-to-one connection. The third PC5-S message could be used for completing security context establishment between the first UE and the second UE.

In one embodiment, the first UE could receive a fourth PC5-S message from the second UE for completing the procedure for establishing the one-to-one connection, wherein a presence of QoS information in the fourth PC5-S message is optional. The third PC5-S message could be transmitted to the second UE in response to reception of the second PC5-S message from the second UE. The third PC5-S message may include a first QoS information if the one-to-one connection is used for a unicast communication or a UE-to-UE relay communication. The third PC5-S message may not be include any QoS information if the one-to-one connection is used for a UE-to-Network relay communication.

In one embodiment, the fourth PC5-S message may include a second QoS information if the one-to-one connection is used for a unicast communication or a UE-to-UE relay communication. The fourth PC5-S message may not include any QoS information if the one-to-one connection is used for a UE-to-Network relay communication.

In one embodiment, the first UE may be a remote UE and the second UE may be a relay UE if the one-to-one connection is used for a UE-to-Network relay communication or a UE-to-UE relay communication.

Referring back to FIGS. 3 and 4, in one exemplary embodiment of a first UE to perform a procedure for establishing a one-to-one connection between the first UE and a second UE, the first UE 300 includes a program code 312 stored in the memory 310. The CPU 308 could execute program code 312 to enable the first UE to transmit a third PC5-S message to the second UE within the procedure for establishing the one-to-one connection, wherein a presence of QoS information in the third PC5-S message is optional. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) to establish one-to-one connection between the first UE and a second UE, comprising:
   initiating a procedure of establishing the one-to-one connection with the second UE, wherein the procedure is used to support (i) a unicast communication between the first UE and the second UE, and (ii) a UE-to-Network communication between the first UE and a network node via the second UE;
   transmitting a first PC5 Signaling (PC5-S) message to the second UE for completing establishment of a first security context for the one-to-one connection in the procedure of establishing the one-to-one connection when the procedure is initiated for the unicast communication, wherein the first PC5-S message optionally includes a field used to indicate Quality of Service (QoS) information for the unicast communication; and
   transmitting a second PC5-S message to the second UE for completing establishment of a second security context for the one-to-one connection in the procedure of establishing the one-to-one connection when the procedure is initiated for the UE-to-Network communication, wherein the second PC5-S message does not include the field used to indicate QoS information for the UE-to-Network communication.

2. The method of claim 1, further comprising:
   transmitting a third PC5-S message to the second UE for initiating the procedure of establishing the one-to-one connection; and
   receiving a fourth PC5-S message from the second UE for completing the procedure of establishing the one-to-one connection.

3. The method of claim 2, wherein the third PC5-S message is a Direct Communication Request message or a Direct Link Establishment Request message, and the fourth PC5-S message is a Direct Communication Accept message or a Direct Link Establishment Accept message.

4. The method of claim 1, further comprising:
   receiving a fifth PC5-S message from the second UE for establishing the first security context for the one-to-one connection in the procedure of establishing the one-to-one connection.

5. The method of claim 4, wherein the fifth PC5-S message is a Security Mode Command message or a Direct Link Security Mode Command message, and wherein the first or second PC5-S message is a Security Mode Complete message or a Direct Link Security Mode Complete message.

6. The method of claim 1, wherein a presence of the field used to indicate the QoS information in the first PC5-S message is defined as optional and the field used to indicate the QoS information is present in the first PC5-S message.

7. The method of claim 1, wherein a presence of the field used to indicate QoS information in the second PC5-S message is defined as optional and the field used to indicate QoS information is absent in the second PC5-S message.

8. A method for a first User Equipment (UE) to establish one-to-one connection between the first UE and a second UE, comprising:
   transmitting a first PC5 Signaling (PC5-S) message to the second UE for initiating a procedure of establishing the one-to-one connection with the second UE, wherein the procedure is used to support (i) a unicast communication between the first UE and the second UE, and (ii) a UE-to-Network communication between the first UE and a network node via the second UE;
   receiving a second PC5-S message from the second UE for establishing a security context between the first UE and the second UE in the procedure of establishing the one-to-one connection;
   transmitting a third PC5-S message to the second UE for completing establishment of the security context in the procedure of establishing the one-to-one connection, wherein a presence of a field used to indicate Quality of Service (QoS) information in the third PC5-S message is defined as optional; and
   receiving a fourth PC5-S message from the second UE for completing the procedure of establishing the one-to-one connection.

9. The method of claim 8, wherein the third PC5-S message includes the field used to indicate a QoS information when the one-to-one connection is used for the unicast communication between the first UE and the second UE, and the third PC5-S message does not include the field used to indicate QoS information when the one-to-one connection is used for the UE-to-Network communication between the first UE and a network node via the second UE.

10. The method of claim 8, wherein the first PC5-S message is a Direct Communication Request message or a Direct Link Establishment Request message, and the fourth PC5-S message is a Direct Communication Accept message or a Direct Link Establishment Accept message.

11. The method of claim 8, wherein the second PC5-S message is a Security Mode Command message or a Direct Link Security Mode Command message, and the third PC5-S message is a Security Mode Complete message or a Direct Link Security Mode Complete message.

12. A first remote UE (User Equipment), comprising:
   a control circuit;
   a processor installed in the control circuit; and
   a memory installed in the control circuit and operatively coupled to the processor;
   wherein the processor is configured to execute a program code stored in the memory to:
      initiate a procedure of establishing the one-to-one connection with the second UE, wherein the procedure is used to support (i) a unicast communication between the first UE and the second UE, and (ii) a UE-to-Network communication between the first UE and a network node via the second UE;
      transmit a first PC5 Signaling (PC5-S) message to the second UE for completing establishment of a first security context in the procedure of establishing the one-to-one connection when the procedure is initiated for the unicast communication, wherein the first PC5-S message optionally includes a field used to indicate Quality of Service (QoS) information for the unicast communication; and
      transmit a second PC5-S message to the second UE for completing establishment of a second security con text in the procedure of establishing the one-to-one connection when the procedure is initiated for the UE-to-Network communication, wherein the second PC5-S message does not include the field used to indicate QoS information for the UE-to-Network communication.

13. The first UE of claim 12, wherein the processor is configured to execute a program code stored in the memory to:
   transmit a third PC5-S message to the second UE for initiating the procedure of establishing the one-to-one connection; and
   receive a fourth PC5-S message from the second UE for completing the procedure of establishing the one-to-one connection.

14. The first UE of claim 13, wherein the third PC5-S message is a Direct Communication Request message or a Direct Link Establishment Request message, and the fourth PC5-S message is a Direct Communication Accept message or a Direct Link Establishment Accept message.

15. The first UE of claim 12, wherein the processor is configured to execute a program code stored in the memory to:
   receive a fifth PC5-S message from the second UE for establishing the first or second security context for the one-to-one connection in the procedure of establishing the one-to-one connection.

16. The first UE of claim 15, wherein the fifth PC5-S message is a Security Mode Command message or a Direct Link Security Mode Command message, and wherein the first/second PC5-S message is a Security Mode Complete message or a Direct Link Security Mode Complete message.

17. The first UE of claim 12, wherein a presence of the field used to indicate the QoS information in the first PC5-S message is defined as optional and the field used to indicate the QoS information is present in the first PC5-S message.

18. The first UE of claim 12, wherein a presence of the field used to indicate QoS information in the second PC5-S message is defined as optional and the field used to indicate QoS information is absent in the second PC5-S message.

* * * * *